(12) United States Patent
Abe et al.

(10) Patent No.: US 12,493,165 B2
(45) Date of Patent: Dec. 9, 2025

(54) INFINITY-CORRECTED MICROSCOPE OBJECTIVE

(71) Applicant: Evident Corporation, Tatsuno-machi (JP)

(72) Inventors: Kenichiro Abe, Tatsuno-machi (JP); Shinya Sakata, Tatsuno-machi (JP)

(73) Assignee: Evident Corporation, Nagano (JP)

( * ) Notice: Subject to any disclaimer, the term of this patent is extended or adjusted under 35 U.S.C. 154(b) by 353 days.

(21) Appl. No.: 18/076,918

(22) Filed: Dec. 7, 2022

(65) Prior Publication Data

US 2023/0185055 A1 Jun. 15, 2023

(30) Foreign Application Priority Data

Dec. 14, 2021 (JP) ................................. 2021-202596

(51) Int. Cl.
*G02B 9/12* (2006.01)
*G02B 9/14* (2006.01)
(Continued)

(52) U.S. Cl.
CPC ................ *G02B 9/12* (2013.01); *G02B 9/14* (2013.01); *G02B 9/22* (2013.01); *G02B 21/02* (2013.01)

(58) Field of Classification Search
CPC ... G02B 9/12; G02B 9/14; G02B 9/18; G02B 9/22; G02B 9/24; G02B 9/26; G02B 9/28; G02B 15/143105; G02B 21/02
(Continued)

(56) References Cited

U.S. PATENT DOCUMENTS 2,627,204 A * 2/1953 Albrecht .................. G02B 9/34
359/740
2,681,594 A * 6/1954 Ito .......................... G02B 13/00
359/778
(Continued)

FOREIGN PATENT DOCUMENTS

CN 104297912 A 1/2015
CN 110703432 A * 1/2020 ............... G01V 8/10
(Continued)

OTHER PUBLICATIONS

Machine translation of JP-09113802-A retrieved electronically from PE2E Search Apr. 18, 2025 (Year: 2025).*

(Continued)

*Primary Examiner* — Cara E Rakowski
(74) *Attorney, Agent, or Firm* — Holtz, Holtz & Volek PC

(57) ABSTRACT

An objective includes a first lens group having positive power, a second lens group including a pair of lens components having concave surfaces facing each other, and a third lens group having positive power, and the pair of lens components is cemented lenses, and the following conditional expression is satisfied.

$$0.20 \leq d2/L \leq 0.5 \tag{1}$$

where d2 is a distance between a surface situated closest to an image side in a first lens component and a surface situated closest to the object side in a second lens component, the first lens component being a lens component situated on the object side and the second lens component being a lens component situated on the image side of the pair of lens components. L is a distance between a surface situated closest to the object side and a surface situated closest to the image side in the objective.

19 Claims, 21 Drawing Sheets

(51) Int. Cl.
*G02B 9/22* (2006.01)
*G02B 21/02* (2006.01)

(58) Field of Classification Search
USPC .............................. 359/661, 784, 785, 787
See application file for complete search history.

(56) References Cited

U.S. PATENT DOCUMENTS

| | | | |
|---|---|---|---|
| 3,912,359 A | 10/1975 | Uetake et al. | |
| 4,166,674 A | 9/1979 | Tojyo | |
| 4,227,773 A * | 10/1980 | Tojo | G02B 21/02 359/659 |
| 5,151,820 A * | 9/1992 | Sillitto | G02B 13/18 359/356 |
| 5,627,682 A * | 5/1997 | Nagaoka | G02B 15/143105 359/688 |
| 5,774,272 A | 6/1998 | Watanabe | |
| 2005/0162756 A1* | 7/2005 | Harada | G02B 27/4211 359/745 |
| 2021/0068655 A1* | 3/2021 | Zhang | A61B 3/103 |
| 2021/0294073 A1* | 9/2021 | Kondo | G02B 13/0035 |

FOREIGN PATENT DOCUMENTS

| | | |
|---|---|---|
| JP | S49128742 A | 12/1974 |
| JP | S5394945 A | 8/1978 |
| JP | S5436747 A | 3/1979 |
| JP | S5752568 B2 | 11/1982 |
| JP | 09113802 A * | 5/1997 |
| JP | H09138351 A | 5/1997 |
| JP | H11231224 A | 8/1999 |
| JP | 2000249926 A | 9/2000 |
| JP | 2010085426 A | 4/2010 |
| JP | 2013222078 A | 10/2013 |

OTHER PUBLICATIONS

Machine translation of CN-110703432-A retrieved electronically from Espacenet Apr. 17, 2025 (Year: 2025).*
Japanese Office Action (and an English language translation thereof) dated Oct. 7, 2025, issued in counterpart Japanese Application No. 2021-202596.

* cited by examiner

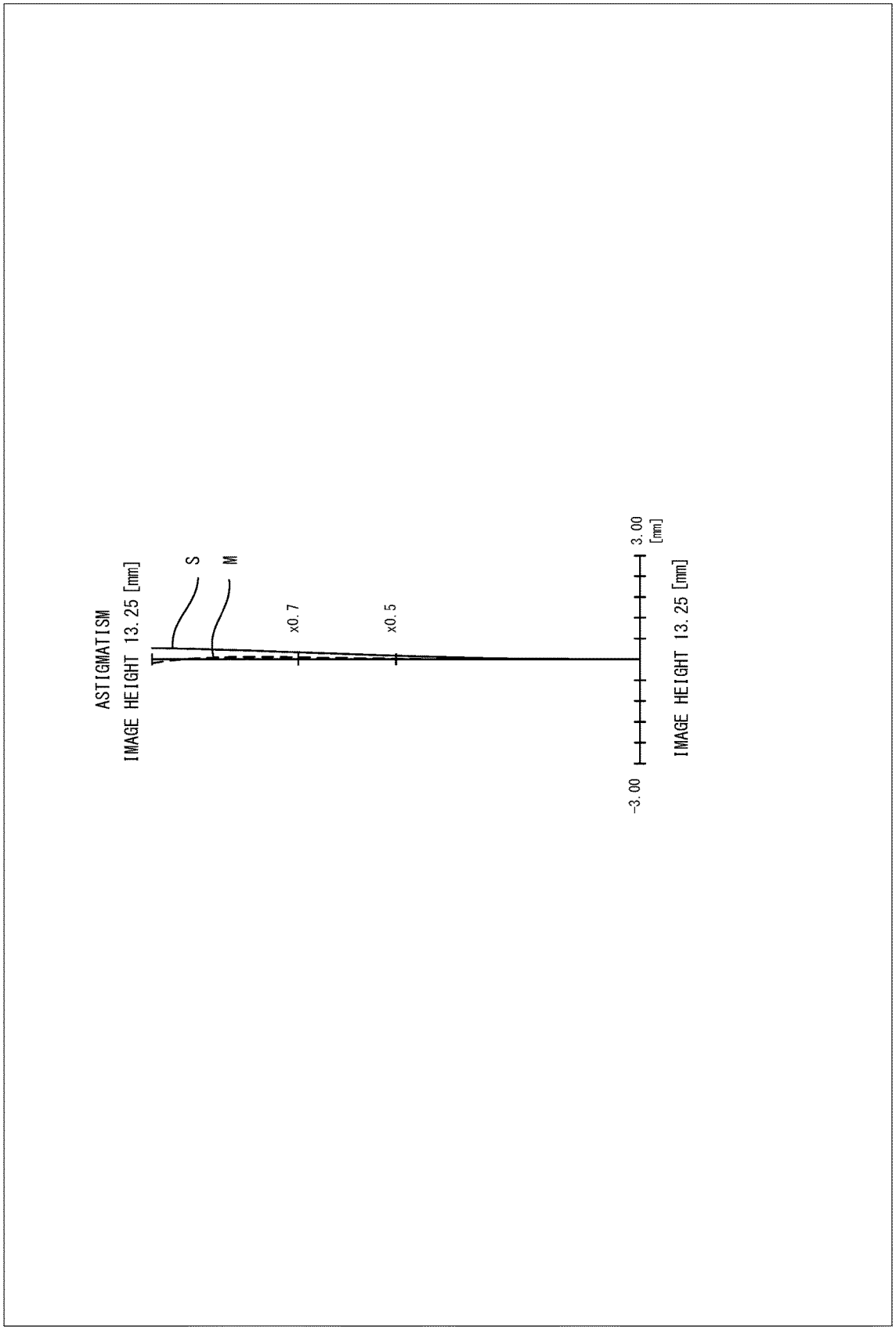

INFINITY-CORRECTED MICROSCOPE OBJECTIVE

CROSS REFERENCE TO RELATED APPLICATIONS

This application is based upon and claims the benefit of priority from prior Japanese Patent Application No. 2021-202596, filed Dec. 14, 2021, the entire contents of which are incorporated herein by this reference.

TECHNICAL FIELD

The disclosure herein relates to an objective.

BACKGROUND

Objectives used in industrial applications are required to have a high numerical aperture (hereinafter, referred to as NA) in order to achieve a high resolution. Further, in order to achieve high throughput, the objectives are also required to have a wide field of view and a long working distance (hereinafter, referred to as WD) for improving the transport speed while preventing the risk of collision between the objective and even an uneven subject.

SUMMARY

An objective according to one aspect of the present invention includes, in order from an object side, a first lens group having positive refractive power, a second lens group including a pair of lens components having concave surfaces facing each other, and a third lens group having positive refractive power. Each of the pair of lens components is a cemented lens. The objective satisfies the following conditional expressions.

$$0.20 \leq d2/L \leq 0.5 \quad (1)$$

where d2 is a distance on an optical axis between a surface that is situated closest to an image side in a first lens component and a surface that is situated closest to the object side in a second lens component, the first lens component being a lens component situated on the object side of the pair of lens components, the second lens component being a lens component situated on the image side of the pair of lens components. L is a distance on an optical axis between a surface that is situated closest to the object side in the objective and a surface that is situated closest to the image side in the objective.

BRIEF DESCRIPTION OF DRAWINGS

The present invention will be more apparent from the following detailed description when the accompanying drawings are referenced.

FIGS. 5A to 5D are diagrams of aberrations in an optical system including the objective and the tube lens;

DESCRIPTION OF EMBODIMENTS

Figure 1:
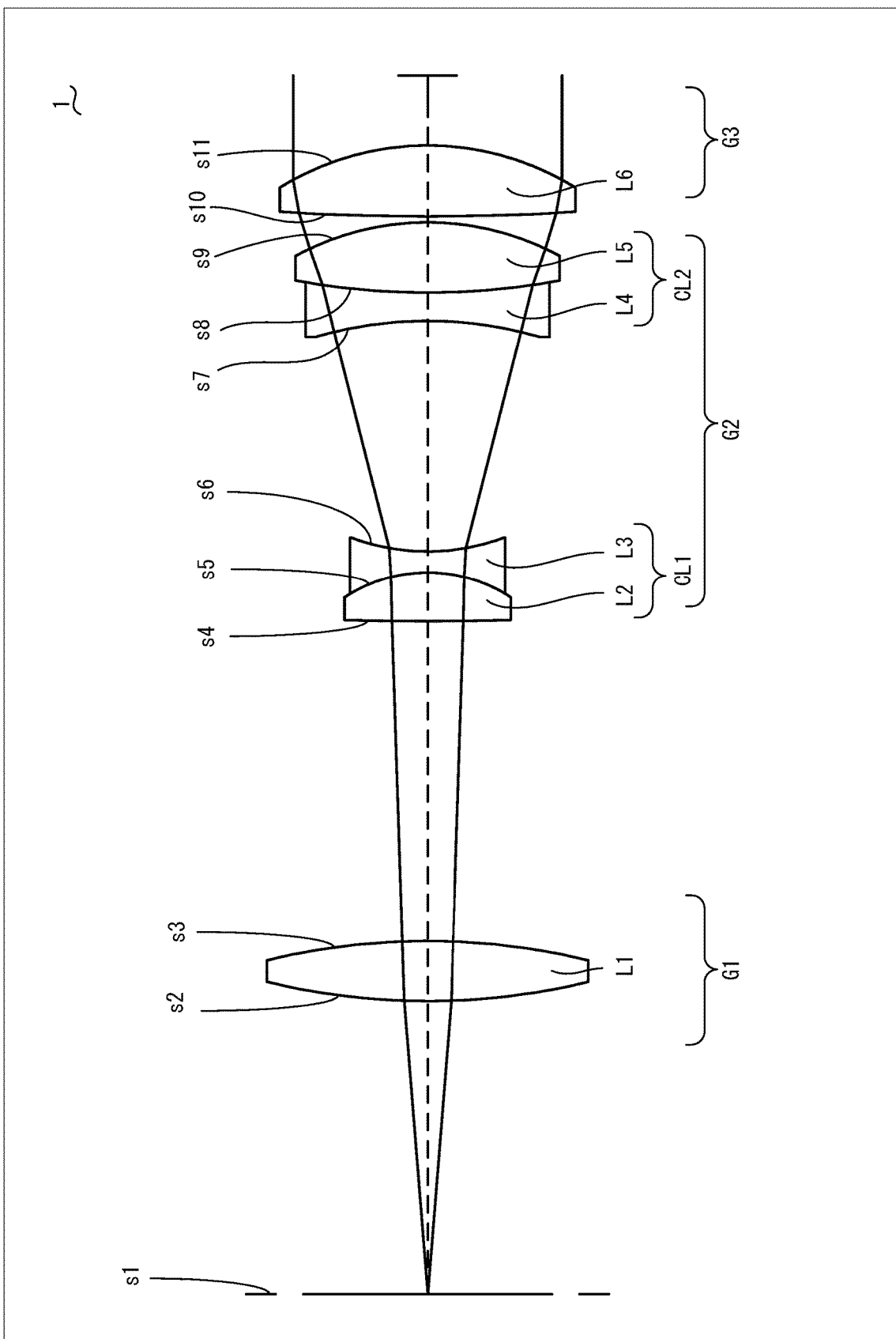
FIG. 1 is a cross-sectional view of an objective according to a first example of the present invention.

For example, JP S57-052568 B discloses a low magnification objective having a wide field of view, and such an objective has a short WD, which is not sufficient. If a long WD is achieved with the configuration of such an objective, mainly, favorable correction to a lateral chromatic aberration is difficult. This makes it difficult to achieve a good resolution to the periphery of a wide field of view.

An objective according to an embodiment of the present application will be described. The objective according to the present embodiment (hereinafter, simply referred to as an objective) is an infinity-corrected microscope objective used in combination with a tube lens.

The objective includes, in order from an object side, a first lens group having positive refractive power, a second lens group including a pair of lens components having concave surfaces facing each other, and a third lens group having positive refractive power. That is, the configuration closer to the object side than the pair of lens components is the first lens group, and the configuration closer to the image side than the pair of lens components is the third lens group. The second lens group has negative refractive power.

In the present specification, the lens component refers to a lens block in which only two surfaces, i.e., a surface on the object side and a surface on the image side, from among lens surfaces through which a light ray from an object point passes have contact with air regardless of whether the lens is a single lens or a cemented lens. That is, one single lens is one lens component, and one cemented lens is also one lens component. On the other hand, a plurality of single lenses and a plurality of cemented lenses arranged via air are not referred to as one lens component herein.

The size of an optical system constituting the objective is substantially limited, and is required to fall within a predetermined size. In order to achieve a wide field of view, that is, a low magnification objective with such an optical system having a predetermined size, it is desirable to use a configuration in which a telephoto-type optical system capable of increasing a focal length without increasing the size is arranged. On the other hand, in order to achieve telecentricity on the object side required for the microscope objective in addition to the long WD, it is desirable to arrange a lens group having positive refractive power on the object side. Taking these factors into consideration, it is desirable to use the above configuration in which a lens group (first lens group, third lens group) having positive refractive power is arranged on each of the object side and the image side and a lens group (second lens group) having negative refractive power is arranged therebetween in the objective having a wide field of view and a long WD.

Further, in order to favorably correct the aberration while allowing the second lens group to have negative refractive power, the second lens group is desirably a pair of lens components in which concave surfaces having negative refractive power face each other. In a case where the second group largely deviates from such a concentric arrangement or an arrangement close thereto, it is difficult to favorably correct a coma aberration mainly.

Thus, the objective desirably has a configuration in which a lens group having positive refractive power is arranged on each side of a pair of lens components with concave surfaces facing each other.

In the objective, each of the pair of lens components with concave surfaces facing each other is a cemented lens. Each of the pair of lens components is configured as a cemented lens in which lenses having different optical characteristics are cemented, so that a chromatic aberration can be sufficiently corrected.

More specifically, the lens component which is situated on the object side (hereinafter, also referred to as a first lens component) of the pair of lens components is mainly used to favorably correct a lateral chromatic aberration; however, if the lens component situated on the object side is not configured as a cemented lens, then it is difficult to effectively correct the lateral chromatic aberration. Further, in order to correct the lateral chromatic aberration and an axial chromatic aberration with balance in the pair of lens components, it is necessary to correct the axial chromatic aberration while reducing the occurrence of the lateral chromatic aberration in the lens component which is situated on the image side (hereinafter, also referred to as a second lens component) of the pair of lens components. The height of a marginal ray is high in a region where the lens component situated on the image side is arranged; therefore, the axial chromatic aberration can be favorably corrected with the configuration as a cemented lens. Further, since the lens component situated on the image side is arranged closer to the object side than the third lens group, the lens component is located in a region where the height of an off-axis ray is low, and as a result, the occurrence of the lateral chromatic aberration can also be reduced to a small extent.

The objective is configured to satisfy the following conditional expression (1).

$$0.20 \le d2/L \le 0.5 \quad (1)$$

Here, d2 is a distance on an optical axis between a surface, closest to the image side, of a lens component (first lens component) situated on the object side of the pair of lens components and a surface, closest to the object side, of a lens component (second lens component) situated on the image side of the pair of lens components. L is a distance on an optical axis between a surface that is situated closest to the object side in the objective and a surface that is situated closest to the image side in the objective.

The conditional expression (1) is a conditional expression that is used to favorably correct the lateral chromatic aberration and the axial chromatic aberration mainly. As described above, configuring the first lens component as a cemented lens makes it possible to increase a function of correcting the lateral chromatic aberration, and configuring the second lens component as a cemented lens makes it possible to favorably correct the axial chromatic aberration.

In a case where d2/L is less than the lower limit (0.2), the distance between the pair of lens components is limited to a short distance. This makes it difficult to favorably correct the lateral chromatic aberration while favorably correcting the axial chromatic aberration. In a case where d2/L exceeds the upper limit (0.5), the distance between the pair of lens components becomes too long, which makes it difficult to achieve both low magnification and telecentricity. In addition, since the second lens component is arranged on the image side more than necessary, the lateral chromatic aberration occurs excessively frequently.

According to the objective configured as described above, it is possible to satisfy the specifications of a long WD and a wide field of view and to favorably correct the aberration to the periphery of the field of view.

Note that the objective may be configured to satisfy the following conditional expression (1-1) or the conditional expression (1-2) instead of the conditional expression (1).

$$0.22 \le d2/L \le 0.4 \quad (1\text{-}1)$$

$$0.24 \le d2/L \le 0.35 \quad (1\text{-}2)$$

A desirable configuration of the objective will be described below.

The first lens group desirably includes one positive lens in order to achieve an objective having a predetermined size and a long WD. In addition, lenses more than necessary are not used in the first lens group, leading to the reduction in manufacturing cost. Further, reducing the number of lenses can reduce the number of elements in which a manufacturing error may occur, which in turn reduces deterioration in aberration due to the manufacturing error.

The third lens group desirably includes one positive lens in order to achieve an objective having a predetermined size and a long focal length. In addition, lenses more than necessary are not used in the third lens group, leading to the reduction in manufacturing cost. Further, reducing the number of lenses can reduce the number of elements in which a manufacturing error may occur, which in turn reduces deterioration in aberration due to the manufacturing error.

The objective desirably satisfies at least one of the following conditional expressions (2) to (8).

$$0.22 \le R_{212}/L \le 0.38 \quad (2)$$

$$-12 \le L/R_{21c} \le -0.4 \quad (3)$$

$$-20 \le f/f_{U21} \le -0.5 \quad (4)$$

$$-6 \le f/f_{U22} \le 1 \quad (5)$$

$$0.7 \le L_{12}/f_{G1} \le 2.1 \quad (6)$$

$$0.25 \le d1/L \le 0.65 \quad (7)$$

$$0 \le d1/L \le 0.05 \quad (8)$$

Here, $R_{212}$ is a radius of curvature of a surface that is situated closest to the image side in the first lens component. $R_{21c}$ is a radius of curvature of the cemented surface of the first lens component. $f_{U21}$ is a focal length of the first lens component. $f_{U22}$ is a focal length of the second lens component. $L_{12}$ is a distance on the optical axis between a surface that is situated closest to the image side in the first lens group and a surface that is situated closest to the object side in the second lens component. $f_{G1}$ is a focal length of the first lens group. d1 is a distance on the optical axis between the surface that is situated closest to the image side in the first lens group and a surface that is situated closest to the object side in the second lens group.

The conditional expression (2) is a conditional expression that is used to favorably correct the field curvature mainly. As described above, the second lens group includes a pair of lens components whose concave surfaces face each other, and the concave surfaces have a correction effect of the Petzval sum. Since $R_{212}/L$ does not exceed the upper limit (0.38), the radius of curvature of the concave surface of the first lens component of the concave surfaces does not become too large, so that the first lens component can have a sufficient correction effect of the Petzval sum. As a result, the field curvature can be favorably corrected in the entire optical system. Further, since $R_{212}/L$ does not fall below the lower limit (0.22), the radius of curvature of the concave surface of the first lens component does not become too small, so that excessive correction to the Petzval sum can be prevented. As a result, the field curvature can be favorably corrected in the entire optical system.

Note that, in the present specification, the radius of curvature of the lens surface is represented by a positive value in a case where the central portion (portion on the optical axis) of the lens surface is positioned closer to the object side than the peripheral portion (portion outside the optical axis), and is represented by a negative value in a case where the central portion (portion on the optical axis) of the lens surface is positioned closer to the image side than the peripheral portion (portion outside the optical axis). That is, the radius of curvature is represented by a positive value in a case where the lens surface has a convex shape on the object side, and represented by a negative value in a case where the lens surface has a convex shape on the image side.

The conditional expression (3) is a conditional expression that is used to favorably correct the lateral chromatic aberration mainly. As described above, the first lens component configured as the cemented lens of the pair of lens components has a function of correcting the lateral chromatic aberration. Further, since the surface on the image side of the first lens component is a concave surface, it is desirable that the lens on the image side of the first lens component configured as the cemented lens has negative refractive power, and the lens having the negative refractive power is made of a highly dispersed glass material, thereby providing a chromatic aberration correction effect on the cemented surface. In this case, the cemented surface of the first lens component is desirably a concave surface (negative radius of curvature) toward the object side. Since $L/R_{21c}$ does not exceed the upper limit (−0.4), the absolute value of the negative radius of curvature of the cemented surface can be made sufficiently small to achieve large negative refractive power, so that the function of correcting the lateral chromatic aberration can be sufficiently increased in the first lens component. As a result, the lateral chromatic aberration can be favorably corrected in the entire optical system. Further, since $L/R_{21c}$ does not fall below the lower limit (−12), the absolute value of the radius of curvature of the cemented surface of the first lens component does not become too small, so that it is possible to avoid difficulty in processing each lens of the cemented lens.

The conditional expression (4) is a conditional expression that is used to favorably correct the field curvature mainly. As described above, the second lens group includes a pair of lens components whose concave surfaces face each other, and the concave surfaces have a correction effect of the Petzval sum. Since $f/f_{U21}$ does not exceed the upper limit (−0.5), the negative power of the first lens component does not become too small, and the Petzval sum can be favorably corrected. Further, since $f/f_{U21}$ does not fall below the lower limit (−20), the negative power of the first lens component does not become too large; therefore, it is possible to achieve both telecentricity and a long WD without requiring excessive positive power in the first lens group. As a result, the occurrence of aberrations such as astigmatism in the first group can also be reduced to a small extent.

The conditional expression (5) is a conditional expression that is used to favorably correct the field curvature mainly. Since $f/f_{U22}$ does not exceed the upper limit (1), the second lens component does not have excessively large positive power, so that the Petzval sum can be favorably corrected. Further, since $f/f_{U22}$ does not fall below the lower limit (−6), the second lens component situated in a region relatively close to the image in the entire optical system does not have excessively large negative power; therefore, a telephoto-type lens configuration is easy to achieve. This allows good aberration correction while both a wide field of view and a long WD are achieved.

The conditional expression (6) is a conditional expression that is used to favorably correct the astigmatism and the coma aberration mainly. In order to reduce the occurrence of the astigmatism and the coma aberration in the pair of lens components with concave surfaces facing each other while the telecentricity on the object side is maintained, a configuration is desirable in which a focal position of the first lens group at the entrance of parallel light from the object side is in the second lens group. Since $L_{12}/f_{G1}$ does not exceed the upper limit (2.1), the focal position is not excessively close to the object side with respect to the second lens component, so that an angle of refraction of the off-axis principal ray in the second lens component can be reduced. This reduces the astigmatism and the coma aberration to a small extent. Further, since $L_{12}/f_{G1}$ does not fall below the lower limit (0.7), the focal position is not excessively far from the image side with respect to the second lens component, so that an angle of refraction of the off-axis principal ray in the first lens component can be reduced. This reduces the astigmatism and the coma aberration to a small extent.

The conditional expression (7) is a conditional expression that is used to favorably correct a high-order coma aberration mainly in order to achieve an ultra-low magnification objective. The ultra-low magnification objective satisfies f/TL>1. Here, f is the focal length of the objective, and TL is a distance on the optical axis between the object surface and the lens surface of the objective that is situated closest to the image side. In order to increase the focal length while maintaining a long WD and telecentricity, it is necessary to refract the off-axis ray inwardly with the first lens group and to make the height of the off-axis ray sufficiently small to allow the off-axis ray to enter the second lens group. Since d1/L does not fall below the lower limit (0.25), an interval between the first lens group and the second lens group can be sufficiently secured, so that the height of the off-axis ray entering the second lens group can be made small even if the first lens group does not refract the off-axis ray more greatly than necessary. Therefore, the occurrence of the coma aberration in the first lens group can be reduced. The first lens group and the subsequent lens groups are greatly different in height of the off-axis ray. Accordingly, if the low-order coma aberration in the first lens group is corrected by the lens groups subsequent to the first lens group, the high-order coma aberration tends to remain; however, as described above, since the occurrence of the coma aberration in the first lens group can be reduced, the high-order coma aberration in the entire optical system can be corrected favorably. Since d1/L does not exceed the upper limit (0.65), the second group can be arranged close to the object, so that the lateral chromatic aberration can be favorably corrected for the same reason as described above.

The conditional expression (8) is a conditional expression that is used to favorably correct the lateral chromatic aberration mainly in order to achieve an objective with an ultra-long WD. The objective with an ultra-long WD satisfies WD/TL>0.3. Here, WD is the working distance of the objective, and TL is a distance on the optical axis between the object surface and the lens surface of the objective that is situated closest to the image side. Since d1/L does not exceed the upper limit (0.05), the interval between the first lens group and the second lens group can be made sufficiently small, so that the second lens group can be arranged on the object side while maintaining a predetermined WD. This allows the second lens group to have a sufficiently large function of correcting the lateral chromatic aberration, so that the lateral chromatic aberration can be favorably corrected in the entire optical system. It is structurally impossible for d1/L to fall below the lower limit (0).

Note that the objective may be configured to satisfy the following conditional expression (2-1) or conditional expression (2-2) instead of the conditional expression (2). The objective may be configured to satisfy the following conditional expression (3-1) or conditional expression (3-2) instead of the conditional expression (3). The objective may be configured to satisfy the following conditional expression (4-1) or conditional expression (4-2) instead of the conditional expression (4). The objective may be configured to satisfy the following conditional expression (5-1) or conditional expression (5-2) instead of the conditional expression (5). The objective may be configured to satisfy the following conditional expression (6-1) or conditional expression (6-2) instead of the conditional expression (6). The objective may be configured to satisfy the following conditional expression (7-1) or conditional expression (7-2) instead of the conditional expression (7). The objective may be configured to satisfy the following conditional expression (8-1) or conditional expression (8-2) instead of the conditional expression (8).

$$0.23 \leq R_{212}/L \leq 0.35 \quad (2\text{-}1)$$

$$0.24 \leq R_{212}/L \leq 0.32 \quad (2\text{-}2)$$

$$-9.6 \leq L/R_{21c} \leq -0.6 \quad (3\text{-}1)$$

$$-6.5 \leq L/R_{21c} \leq -0.9 \quad (3\text{-}2)$$

$$-16 \leq f/f_{U21} \leq -2.8 \quad (4\text{-}1)$$

$$-13 \leq f/f_{U21} \leq -5.6 \quad (4\text{-}2)$$

$$-5 \leq f/f_{U22} \leq 0.5 \quad (5\text{-}1)$$

$$-4 \leq f/f_{U22} \leq -0.5 \quad (5\text{-}2)$$

$$0.75 \leq L_{12}/f_{G1} \leq 1.8 \quad (6\text{-}1)$$

$$0.8 \leq L_{12}/f_{G1} \leq 1.6 \quad (6\text{-}2)$$

$$0.30 \leq d1/L \leq 0.55 \quad (7\text{-}1)$$

$$0.35 \leq d1/L \leq 0.45 \quad (7\text{-}2)$$

$$0 \leq d1/L \leq 0.04 \quad (8\text{-}1)$$

$$0 \leq d1/L \leq 0.02 \quad (8\text{-}2)$$

Embodiments of the objective described above will be specifically described below.

First Example

FIG. 1 is a cross-sectional view of an objective 1 according to the present example. The objective 1 is a microscope objective, and includes a first lens group G1 that has positive refractive power, a second lens group G2 including a pair of lens components that are cemented lenses and have concave surfaces facing each other, and a third lens group G3 that has positive refractive power.

The first lens group G1 includes a single lens, and the single lens is a lens L1 that is a biconvex lens. The second lens group includes a cemented lens CL1 and a cemented lens CL2. The cemented lens CL1 and the cemented lens CL2 are a pair of lens components whose concave surfaces face each other. The cemented lens CL1 is a two-piece cemented lens and includes, in order from the object side, a lens L2 that is a biconvex lens and a lens L3 that is a biconcave lens. The cemented lens CL2 is a two-piece cemented lens and includes, in order from the object side, a lens L4 that is a biconcave lens and a lens L5 that is a biconvex lens. The third lens group G3 includes a single lens, and the single lens is a lens L6 that is a biconvex lens.

Various data of the objective 1 are as follows. Note that β is a magnification for a case where the objective 1 is combined with a tube lens 10. $NA_{ob}$ is a numerical aperture on the object side of the objective 1. f, $f_{G1}$, $f_{G2}$, and $f_{G3}$ are a focal length of the objective, a focal length of the first lens group G1, a focal length of the second lens group G2, and a focal length of the third lens group G3, respectively. The other parameters are as described above.

$NA_{ob}$=0.08, β=2.5, f=71.962 mm, $f_{G1}$=22.476 mm, $f_{G2}$=−6.898 mm, $f_{G3}$=21.721 mm, TL=49.12 mm, WD=12.539 mm, L=36.581 mm, d1=13.657 mm, d2=9.869 mm, $L_{12}$=26.519 mm, $f_{U21}$=−7.809 mm, $f_{U22}$=−78.090 mm, $R_{212}$=9.2794 mm, $R_{21c}$=−6.4679 mm

Lens data of the objective 1 is as follows. Note that INF in the lens data represents infinity (∞).

| Objective Lens 1 | | | | |
|---|---|---|---|---|
| s | r | d | nd | vd |
| 1 | INF | 12.539 | | |
| 2 | 28.8854 | 2.578 | 1.65412 | 39.68 |
| 3 | −28.8854 | 13.657 | | |
| 4 | 127.4825 | 2.093 | 1.43875 | 94.66 |
| 5 | −6.4679 | 0.900 | 1.75500 | 52.32 |
| 6 | 9.2794 | 9.869 | | |
| 7 | −16.9117 | 1.200 | 1.75500 | 52.32 |
| 8 | 30.8327 | 3.000 | 1.43875 | 94.66 |
| 9 | −11.8529 | 0.250 | | |
| 10 | 100.5080 | 3.033 | 1.49700 | 81.54 |
| 11 | −11.9734 | 110.000 | | |

Here, s represents a surface number, r represents a radius of curvature (mm), d represents surface spacing (mm), nd represents a refractive index with respect to the d line, and vd represents an Abbe number. These symbols are also used in the following examples. A surface number s1 represents a sample surface. Surface numbers s2 and s11 represent a lens surface of the objective 1 that is situated closest to the object side and a lens surface of the objective 1 that is situated closest to the image side, respectively. For example, surface spacing d1 represents a distance on the optical axis between the surface represented by the surface number s1 and the surface represented by the surface number s2. Surface spacing d11 represents a distance (110 mm) on the optical axis between the surface represented by the surface number s11 and the tube lens.

The objective 1 satisfies the conditional expressions (1) to (7) as described below.

$$d2/L = 0.270 \quad (1)$$

$$R_{212}/L = 0.254 \quad (2)$$

$$L/R_{21c} = -5.656 \quad (3)$$

$$f/f_{U21} = -9.215 \quad (4)$$

$$f/f_{U22} = -0.922 \quad (5)$$

$$L_{12}/f_{G1}=1.180 \quad (6)$$

$$d1/L=0.373(f/TL=1.465, WD/TL=0.255) \quad (7)(8)$$

Figure 2:
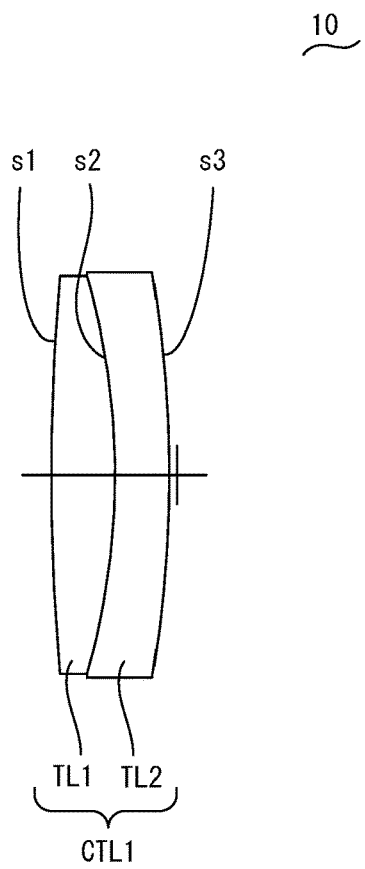
FIG. 2 is a cross-sectional view of a tube lens.

FIG. 2 is a cross-sectional view of the tube lens 10 used in combination with the objective 1. The tube lens 10 is a microscope tube lens that forms an enlarged image of an object in combination with an infinity-corrected objective. The tube lens 10 is a cemented lens CTL1 including a lens TL1 that is a biconvex lens and a lens TL2 that is a meniscus lens arranged on an image side of the biconvex lens and having a concave surface facing the object side. The tube lens 10 is disposed such that the distance on the optical axis between the lens surface (surface number s11) closest to the image side of the objective 1 and the lens surface (surface number s1) closest to the object side of the tube lens 10 is 110 mm. Note that the focal length of the tube lens 10 is 180 mm.

Lens data of the tube lens 10 is as follows.

| | | Imaging Lens 10 | | |
|---|---|---|---|---|
| s | r | d | nd | v d |
| 1 | 193.123 | 5.5 | 1.48749 | 70.23 |
| 2 | −61.238 | 4.6 | 1.72047 | 34.71 |
| 3 | −105.391 | | | |

Figure 3A:
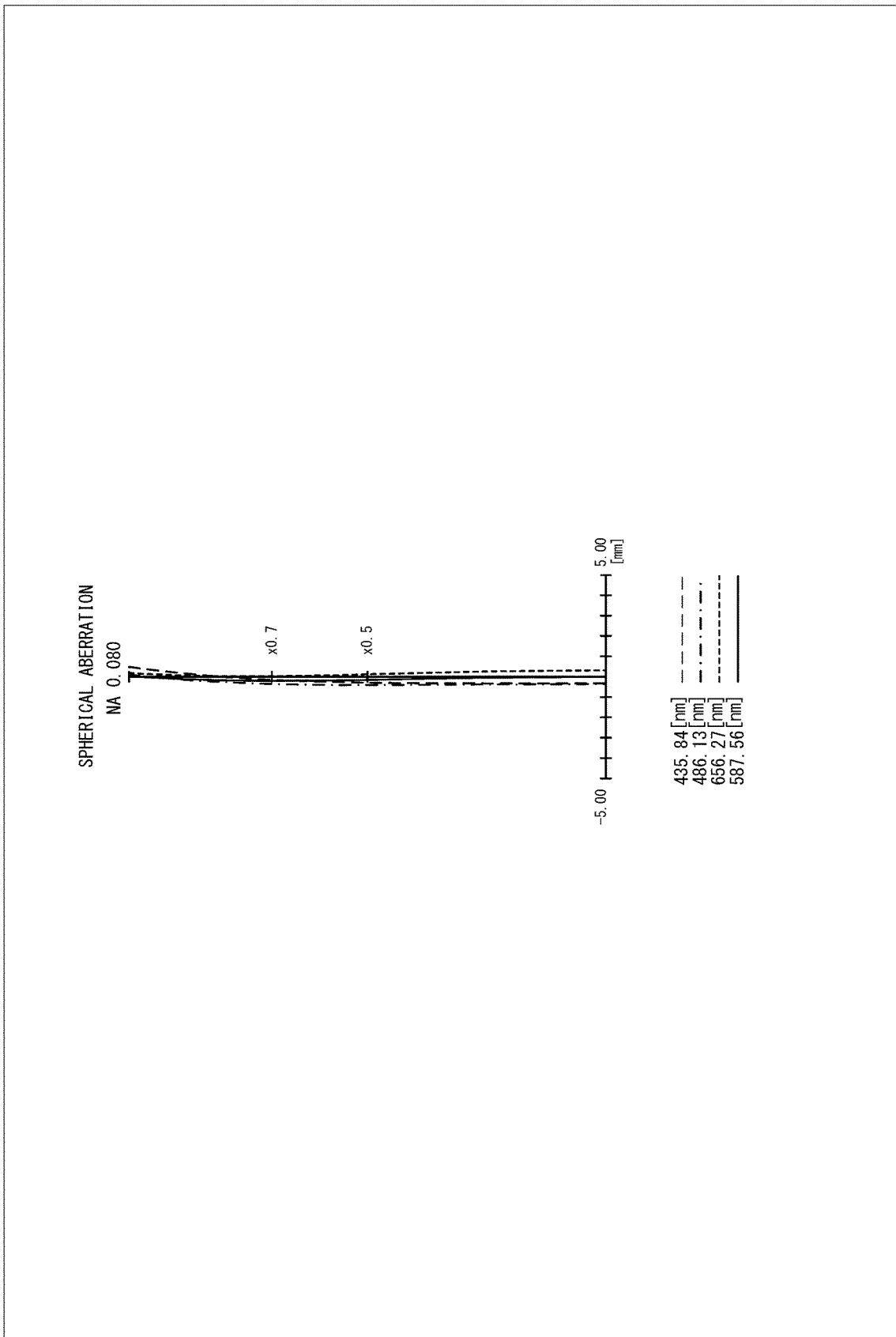
FIGS. 3A to 3D are diagrams of aberrations in an optical system including the objective and the tube lens.
Figure 3B:
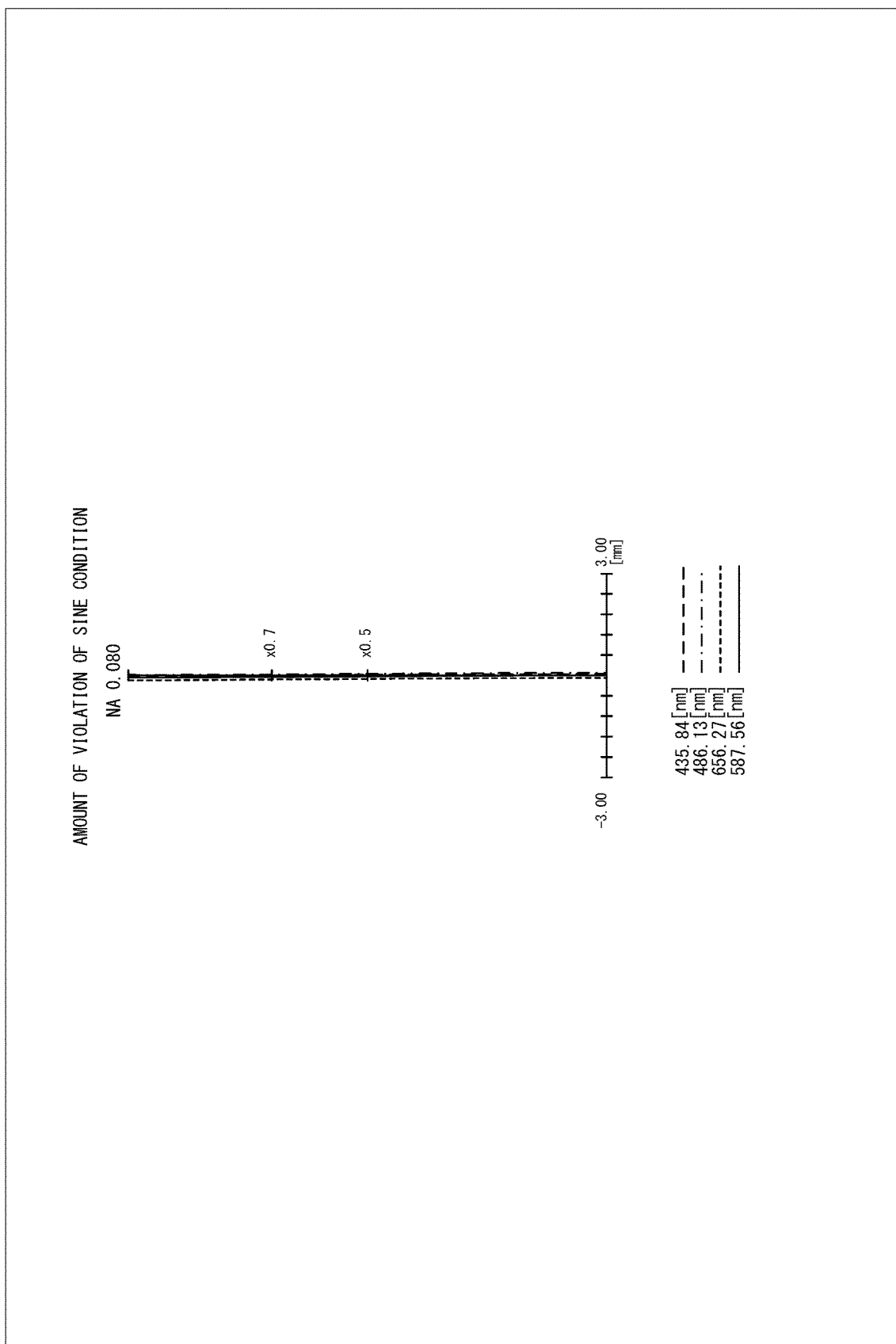
Figure 3C:
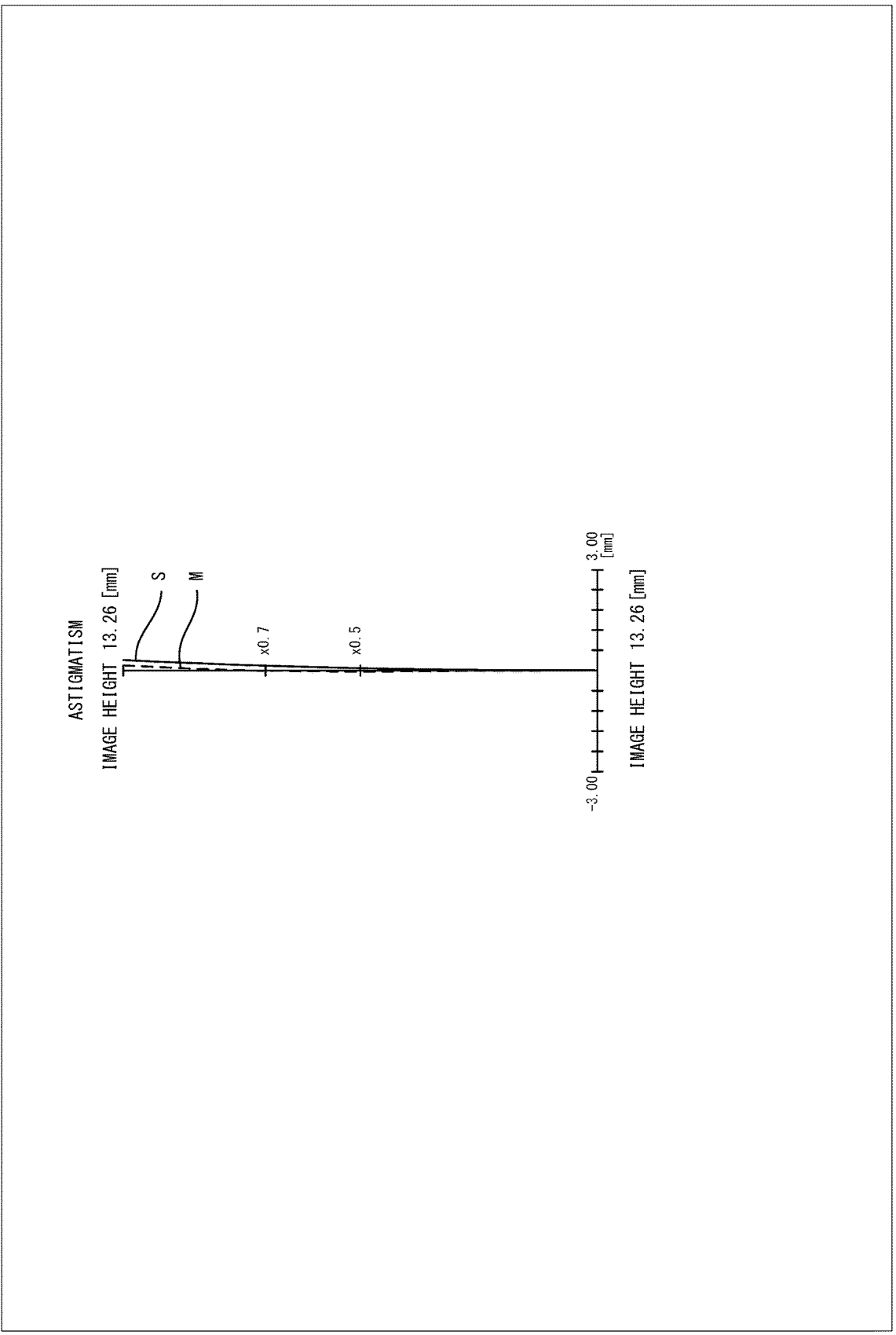
Figure 3D:
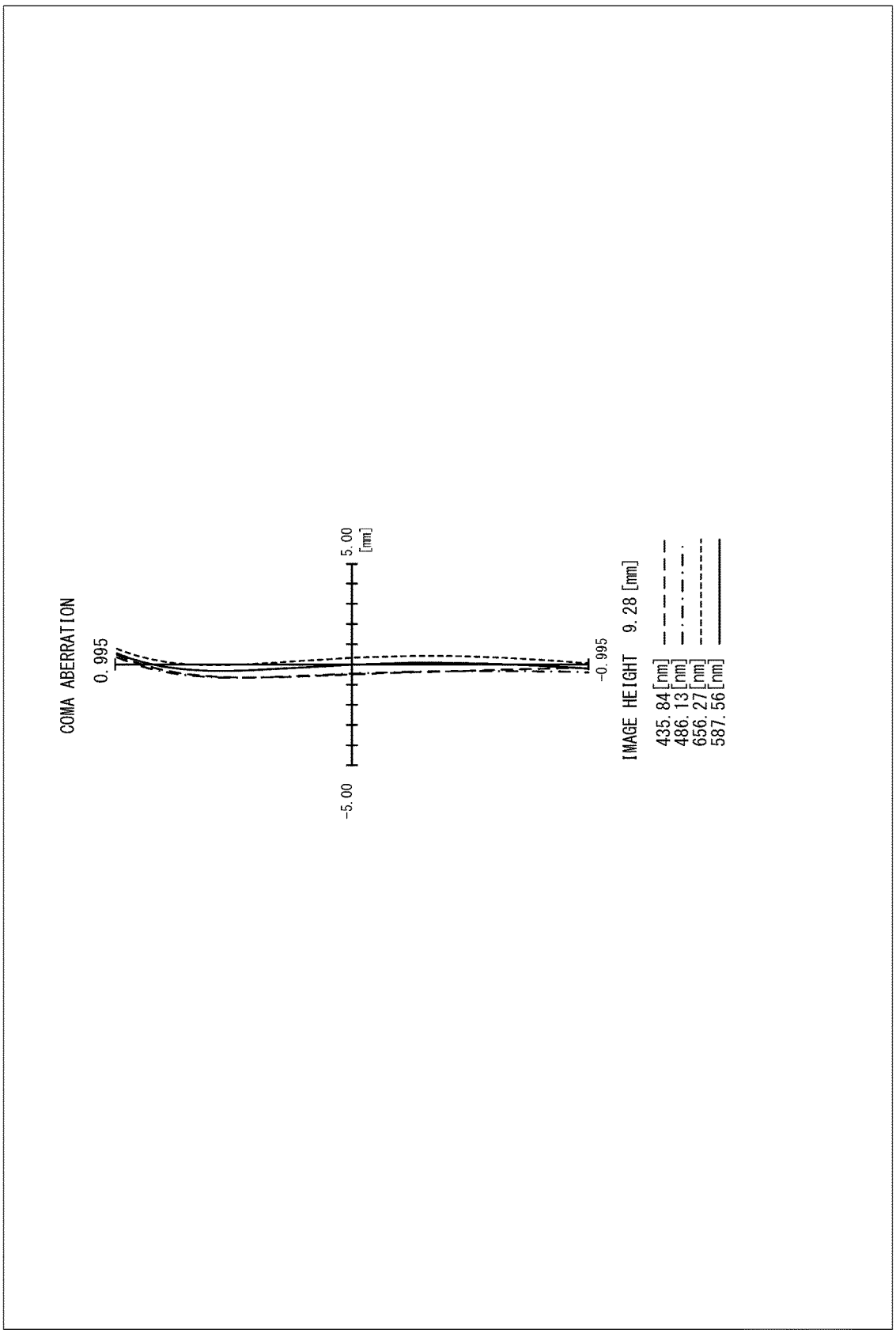

FIGS. 3A to 3D are diagrams of aberrations in an optical system including the objective 1 and the tube lens 10, and illustrate aberrations on an image plane on which the objective 1 and the tube lens 10 form an optical image. FIG. 3A is a diagram of a spherical aberration. FIG. 3B is a diagram illustrating an amount of violation of the sine condition. FIG. 3C is a diagram of astigmatism. FIG. 3D is a diagram of a coma aberration at the level of 70% of an image height ratio (image height of 9.28 mm). In the diagrams, "M" represents a meridional component and "S" represents a sagittal component. As illustrated in FIGS. 3A to 3D, in the present embodiment, the aberrations are favorably corrected in a wide field of view.

Second Example

Figure 4:
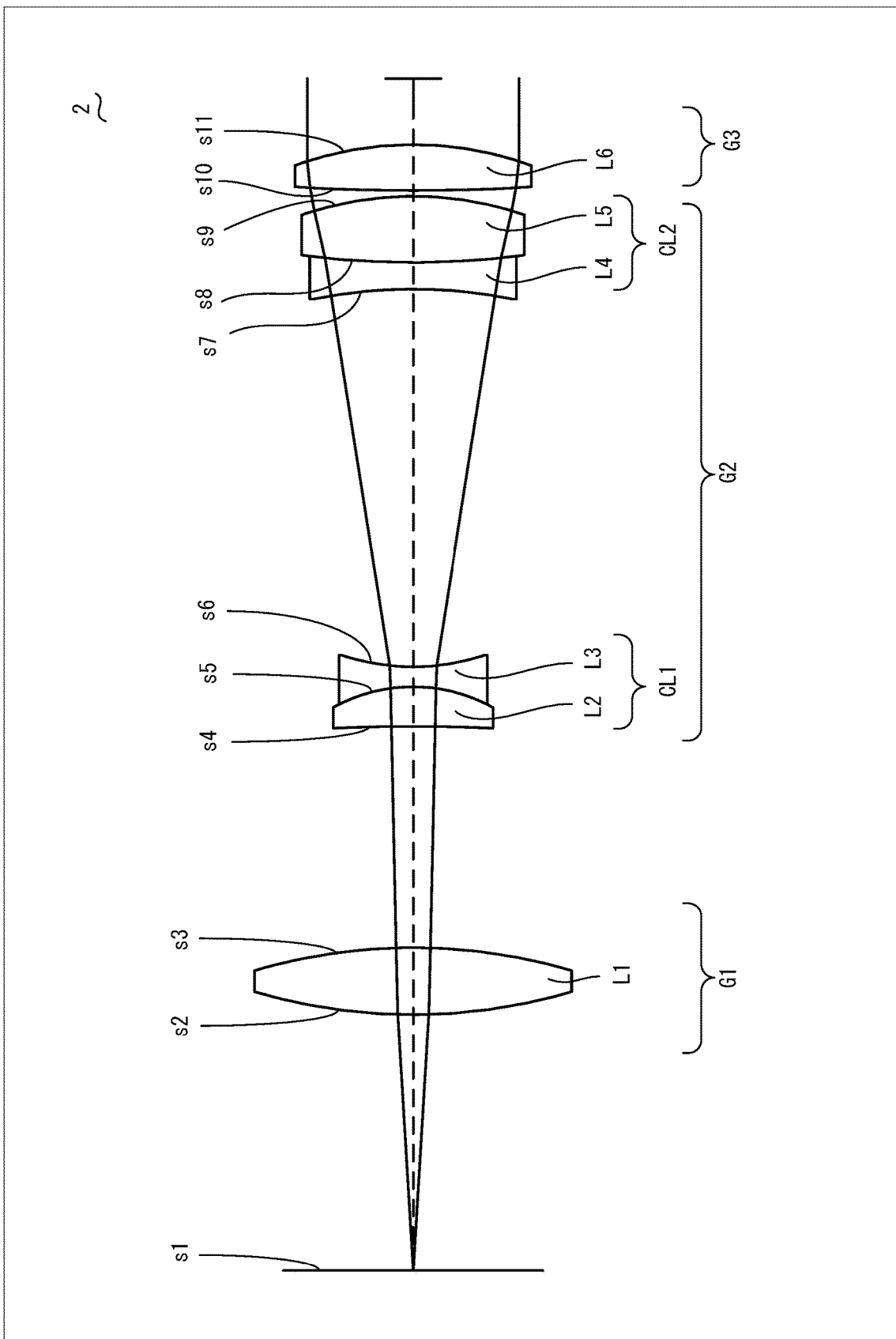
FIG. 4 is a cross-sectional view of an objective according to a second example of the present invention.

FIG. 4 is a cross-sectional view of an objective 2 according to the present example. The objective 2 is a microscope objective, and includes a first lens group G1 that has positive refractive power, a second lens group G2 including a pair of lens components that are cemented lenses and have concave surfaces facing each other, and a third lens group G3 that has positive refractive power.

The first lens group G1 includes a single lens, and the single lens is a lens L1 that is a biconvex lens. The second lens group includes a cemented lens CL1 and a cemented lens CL2. The cemented lens CL1 and the cemented lens CL2 are a pair of lens components whose concave surfaces face each other. The cemented lens CL1 is a two-piece cemented lens and includes, in order from the object side, a lens L2 that is a meniscus lens with a concave surface facing the object side and a lens L3 that is a biconcave lens. The cemented lens CL2 is a two-piece cemented lens and includes, in order from the object side, a lens L4 that is a biconcave lens and a lens L5 that is a biconvex lens. The third lens group G3 includes a single lens, and the single lens is a lens L6 that is a biconvex lens.

Various data of the objective 2 are as follows.

$NA_{ob}=0.06$, $\beta=2.25$, $f=80$ mm, $f_{G1}=19.729$ mm, $f_{G2}=-6.519$ mm, $f_{G3}=26.469$ mm, TL=51.02 mm, WD=11.609 mm, L=39.411 mm, d1=10.020 mm, d2=17.120 mm, $L_{12}=29.831$ mm, $f_{U21}=-7.744$ mm, $f_{U22}=-96.232$ mm, $R_{212}=10.1833$ mm, $R_{21c}=-7.4434$ mm Lens data of the objective 2 is as follows.

| Objective Lens 2 | | | | |
|---|---|---|---|---|
| s | r | d | nd | vd |
| 1 | INF | 11.609 | | |
| 2 | 25.1944 | 3.042 | 1.65412 | 39.68 |
| 3 | −25.1944 | 10.020 | | |
| 4 | −77.8135 | 1.792 | 1.43875 | 94.66 |
| 5 | −7.4434 | 0.900 | 1.77250 | 49.60 |
| 6 | 10.1833 | 17.120 | | |
| 7 | −22.6363 | 1.200 | 1.75500 | 52.32 |
| 8 | 37.7249 | 3.000 | 1.43875 | 94.66 |
| 9 | −15.4462 | 0.250 | | |
| 10 | 83.5544 | 2.087 | 1.49700 | 81.54 |
| 11 | −15.4841 | 110.000 | | |

The objective 2 satisfies the conditional expressions (1) to (7) as described below.

$$d2/L=0.434 \quad (1)$$

$$R_{212}/L=0.258 \quad (2)$$

$$L/R_{22c}=-5.295 \quad (3)$$

$$f/f_{U21}=-10.331 \quad (4)$$

$$f/f_{U22}=-0.831 \quad (5)$$

$$L_{12}/f_{G1}=1.512 \quad (6)$$

$$d1/L=0.254(f/TL=1.568, WD/TL=0.228) \quad (7)(8)$$

Figure 5A:
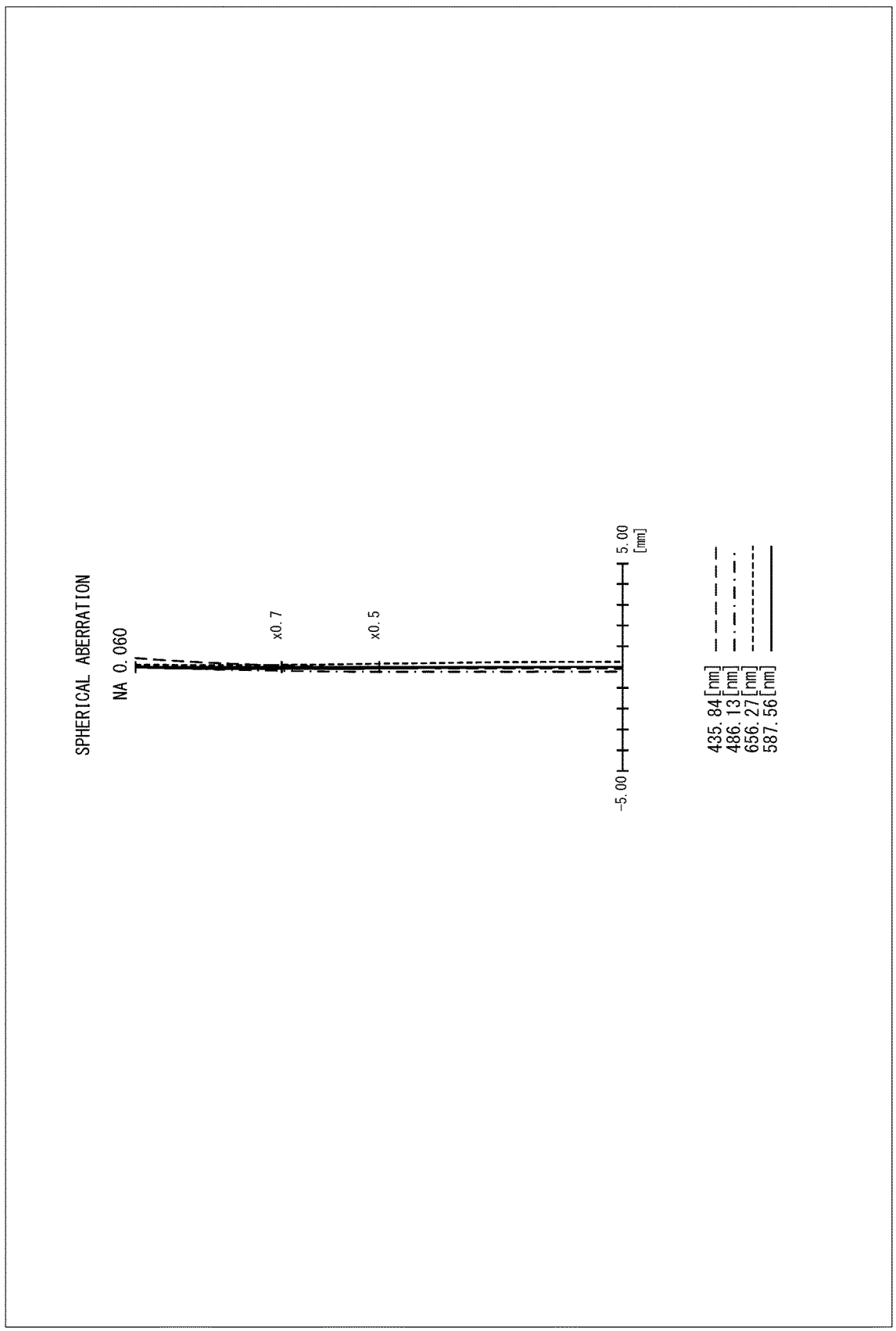
Figure 5B:
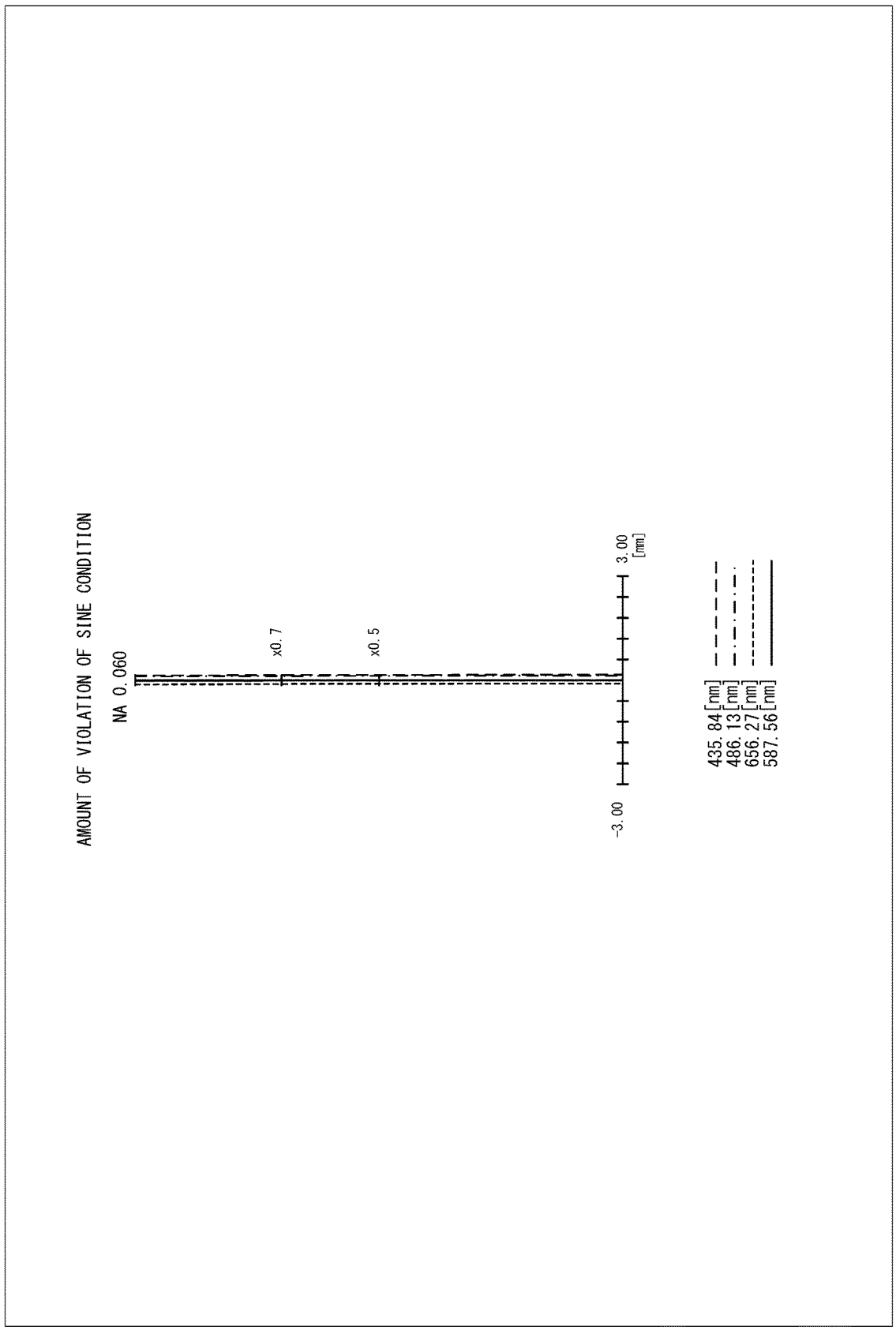
Figure 5D:
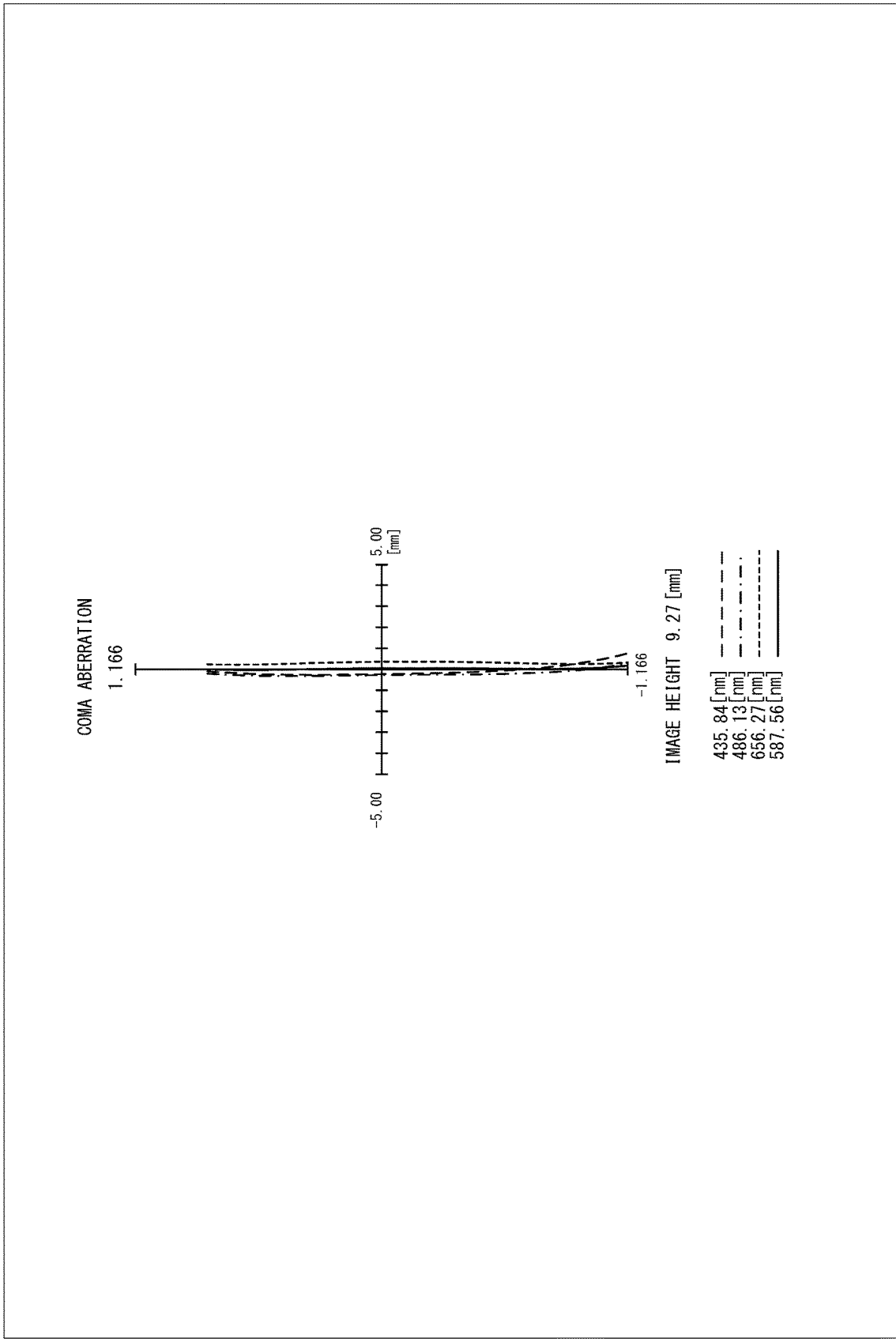

FIGS. 5A to 5D are diagrams of aberrations in an optical system including the objective 2 and the tube lens 10, and illustrate aberrations on an image plane on which the objective 2 and the tube lens 10 form an optical image. FIG. 5A is a diagram of a spherical aberration. FIG. 5B is a diagram illustrating an amount of violation of the sine condition. FIG. 5C is a diagram of astigmatism. FIG. 5D is a diagram of a coma aberration at the level of 70% of an image height ratio (image height of 9.27 mm). As illustrated in FIGS. 5A to 5D, in the present embodiment, the aberrations are favorably corrected in a wide field of view.

Third Example

Figure 6:
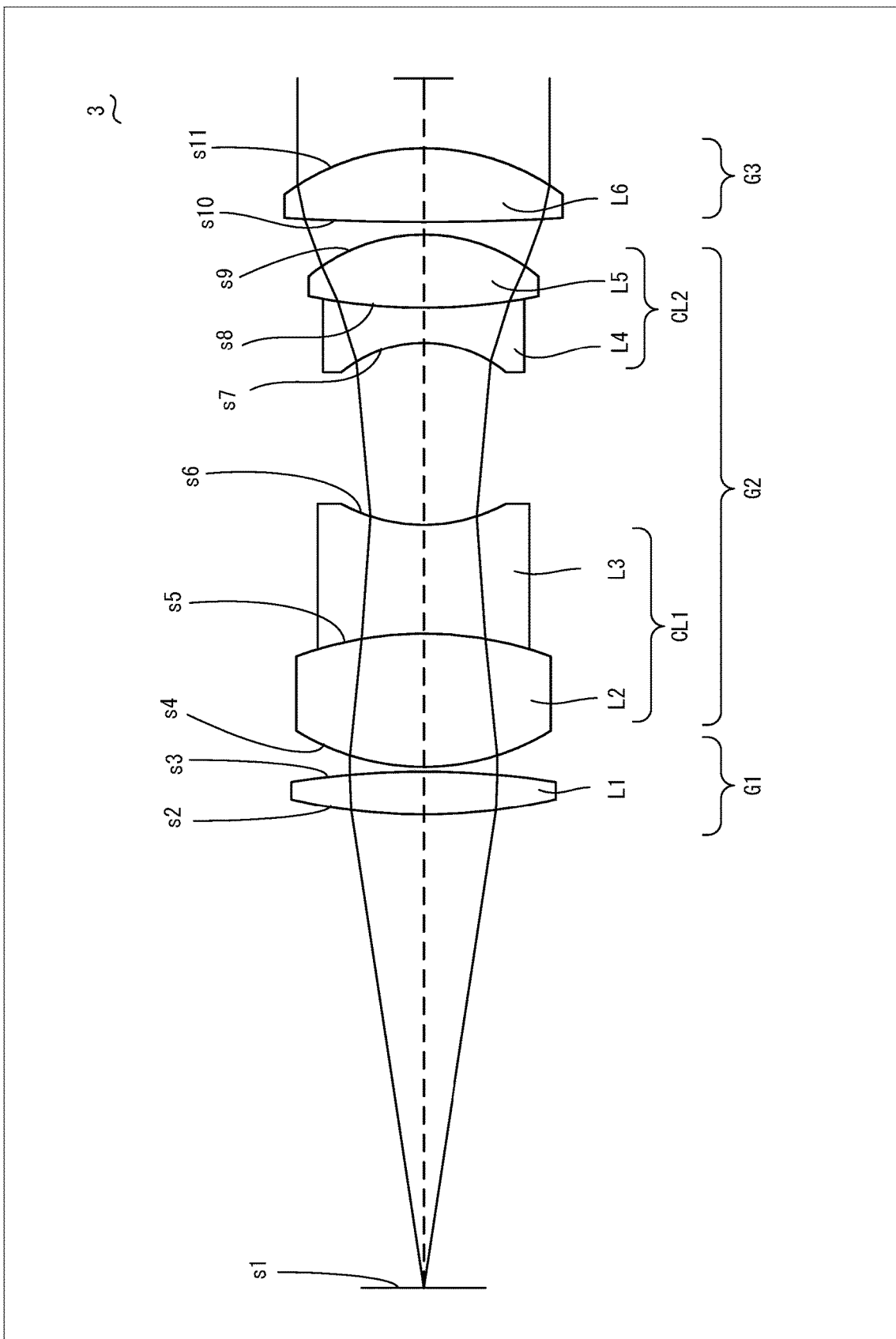
FIG. 6 is a cross-sectional view of an objective according to a third example of the present invention.

FIG. 6 is a cross-sectional view of an objective 3 according to the present example. The objective 3 is a microscope objective, and includes a first lens group G1 that has positive refractive power, a second lens group G2 including a pair of lens components that are cemented lenses and have concave surfaces facing each other, and a third lens group G3 that has positive refractive power.

The first lens group G1 includes a single lens, and the single lens is a lens L1 that is a biconvex lens. The second lens group includes a cemented lens CL1 and a cemented lens CL2. The cemented lens CL1 and the cemented lens CL2 are a pair of lens components whose concave surfaces face each other. The cemented lens CL1 is a two-piece cemented lens and includes, in order from the object side, a lens L2 that is a biconvex lens and a lens L3 that is a biconcave lens. The cemented lens CL2 is a two-piece cemented lens and includes, in order from the object side, a lens L4 that is a biconcave lens and a lens L5 that is a biconvex lens. The third lens group G3 includes a single lens, and the single lens is a lens L6 that is a biconvex lens.

Various data of the objective 3 are as follows.

$NA_{ob}$=0.15, β=5, f=36 mm, $f_{G1}$=20.539 mm, $f_{G2}$=−10.046 mm, $f_{G3}$=17.683 mm, TL=48.838 mm, WD=20.289 mm, L=28.549 mm, d1=0.200 mm, d2=7.807 mm, $L_{12}$=18.373 mm, $f_{U21}$=−34.214 mm, $f_{U22}$=−12.876 mm, $R_{212}$=7.2915 mm, $R_{21c}$=−15.6126 mm

Lens data of the objective 3 is as follows.

| Objective Lens 3 | | | | |
|---|---|---|---|---|
| s | r | d | nd | vd |
| 1 | INF | 20.289 | | |
| 2 | 25.0411 | 1.847 | 1.72916 | 54.68 |
| 3 | −36.1028 | 0.200 | | |
| 4 | 10.4061 | 5.707 | 1.43875 | 94.66 |
| 5 | −15.6126 | 4.660 | 1.61340 | 44.27 |
| 6 | 7.2915 | 7.807 | | |
| 7 | −5.5361 | 1.500 | 1.80400 | 46.53 |
| 8 | 24.6954 | 3.133 | 1.43875 | 94.66 |
| 9 | −7.6813 | 0.535 | | |
| 10 | 102.0044 | 3.160 | 1.51823 | 58.90 |
| 11 | −9.9620 | 110.000 | | |

The objective 3 satisfies the conditional expressions (1) to (6) and (8) as described below.

$d2/L=0.273$ (1)

$R_{212}/L=0.255$ (2)

$L/R_{21c}=-1.829$ (3)

$f/f_{U21}=-1.052$ (4)

$f/f_{U22}=-2.796$ (5)

$L_{12}/f_{G1}=0.895$ (6)

$d1/L=0.007(f/TL=0.737, WD/TL=0.415)$ (7)(8)

Figure 7A:
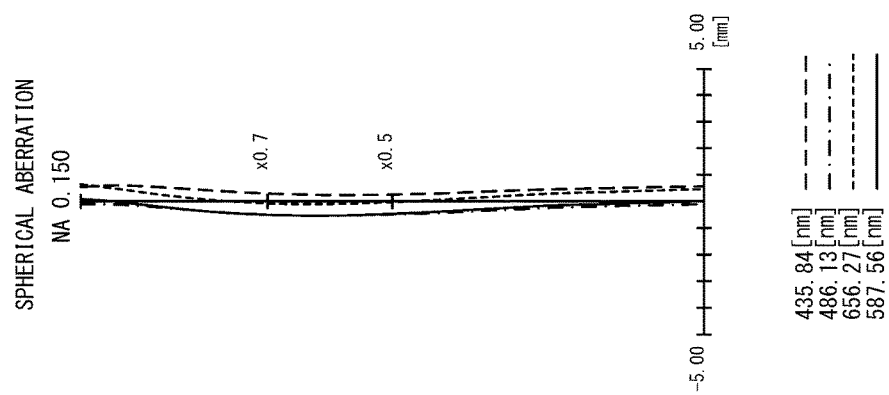
FIGS. 7A to 7D are diagrams of aberrations in an optical system including the objective and the tube lens.
Figure 7B:
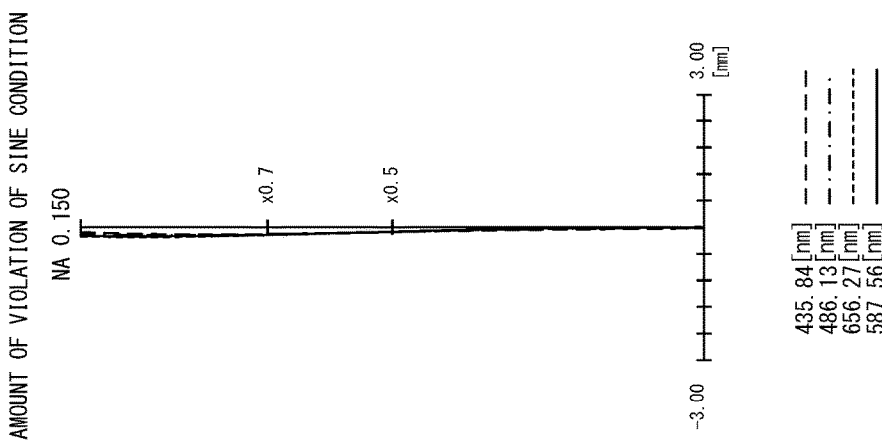
Figure 7C:
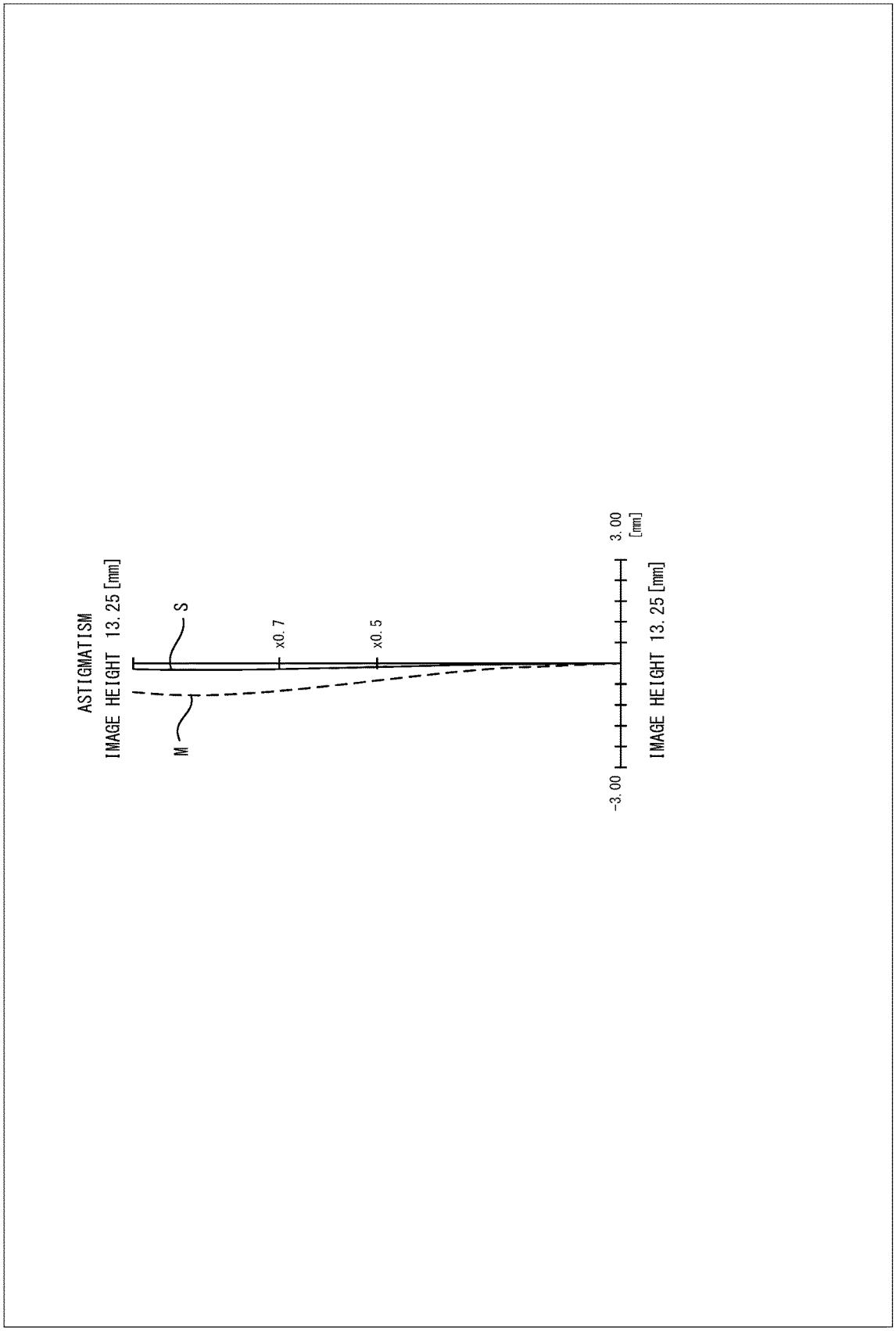
Figure 7D:
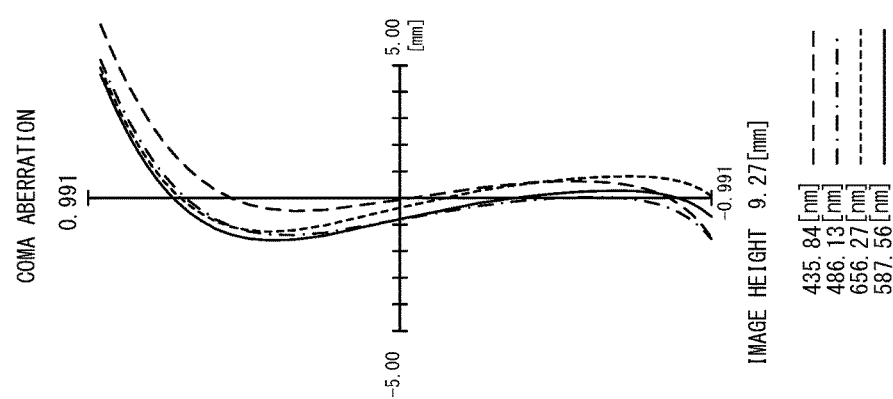

FIGS. 7A to 7D are diagrams of aberrations in an optical system including the objective 3 and the tube lens 10, and illustrate aberrations on an image plane on which the objective 3 and the tube lens 10 form an optical image. FIG. 7A is a diagram of a spherical aberration. FIG. 7B is a diagram illustrating an amount of violation of the sine condition. FIG. 7C is a diagram of astigmatism. FIG. 7D is a diagram of a coma aberration at the level of 70% of an image height ratio (image height of 9.27 mm). As illustrated in FIGS. 7A to 7D, in the present embodiment, the aberrations are favorably corrected in a wide field of view.

Fourth Example

Figure 8:
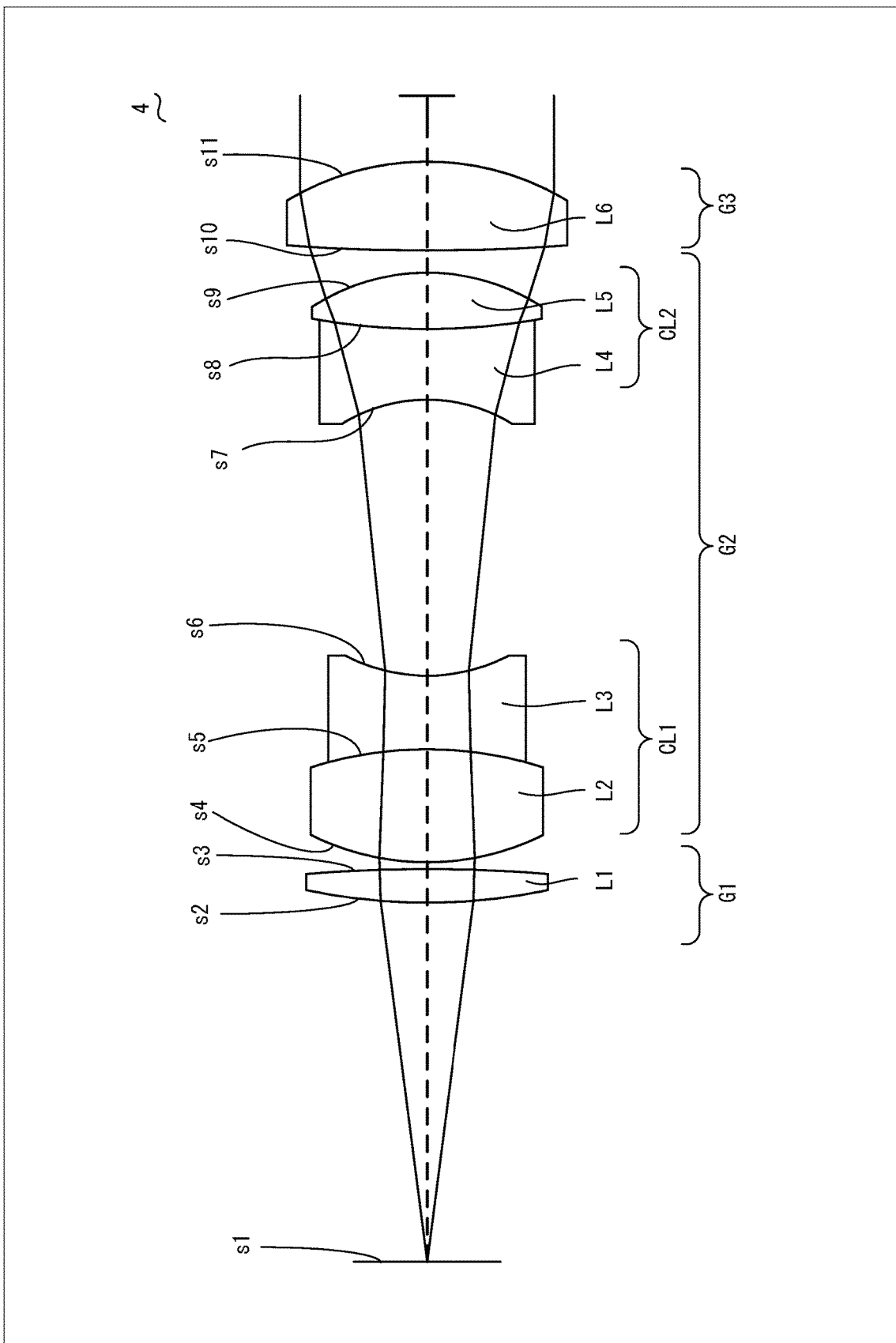
FIG. 8 is a cross-sectional view of an objective according to a fourth example of the present invention.

FIG. 8 is a cross-sectional view of an objective 4 according to the present example. The objective 4 is a microscope objective, and includes a first lens group G1 that has positive refractive power, a second lens group G2 including a pair of lens components that are cemented lenses and have concave surfaces facing each other, and a third lens group G3 that has positive refractive power.

The first lens group G1 includes a single lens, and the single lens is a lens L1 that is a biconvex lens. The second lens group includes a cemented lens CL1 and a cemented lens CL2. The cemented lens CL1 and the cemented lens CL2 are a pair of lens components whose concave surfaces face each other. The cemented lens CL1 is a two-piece cemented lens and includes, in order from the object side, a lens L2 that is a biconvex lens and a lens L3 that is a biconcave lens. The cemented lens CL2 is a two-piece cemented lens and includes, in order from the object side, a lens L4 that is a biconcave lens and a lens L5 that is a biconvex lens. The third lens group G3 includes a single lens, and the single lens is a lens L6 that is a biconvex lens.

Various data of the objective 4 are as follows.

$NA_{ob}$=0.13, β=4, f=45 mm, $f_{G1}$=21.547 mm, $f_{G2}$=−11.001 mm, $f_{G3}$=21.071 mm, TL=50.011 nam, WD=16.31 mm, L=33.701 mm, d1=0.300 mm, d2=12.552 mm, $L_{12}$=21.342 mm, $f_{U21}$=−36.799 mm, $f_{U22}$=−16.932 mm, $R_{212}$=8.0645 mm, $R_{21c}$=−17.3049 mm Lens data of the objective 4 is as follows.

| Objective Lens 4 | | | | |
|---|---|---|---|---|
| s | r | d | nd | vd |
| 1 | INF | 16.310 | | |
| 2 | 26.3865 | 1.533 | 1.88300 | 40.76 |
| 3 | −66.3467 | 0.300 | | |
| 4 | 11.8701 | 5.159 | 1.43875 | 94.66 |
| 5 | −17.3049 | 3.331 | 1.57501 | 41.50 |
| 6 | 8.0645 | 12.552 | | |
| 7 | −7.3760 | 3.224 | 1.80400 | 46.53 |
| 8 | 29.1238 | 2.564 | 1.43875 | 94.66 |
| 9 | −9.5667 | 1.001 | | |
| 10 | 85.5752 | 4.037 | 1.51823 | 58.90 |
| 11 | −12.3154 | 110.000 | | |

The objective 4 satisfies the conditional expressions (1) to (6) and (8) as described below.

$d2/L=0.372$ (1)

$R_{212}/L=0.239$ (2)

$L/R_{21c}=-1.947$ (3)

$f/f_{U21}=-1.223$ (4)

$f/f_{U22}=\mathbf{-2.658}$ (5)

$L_{12}/f_{G1}=0.990$ (6)

$d1/L=0.009(f/TL=0.900, WD/TL=0.326)$ (7)(8)

Figure 9A:
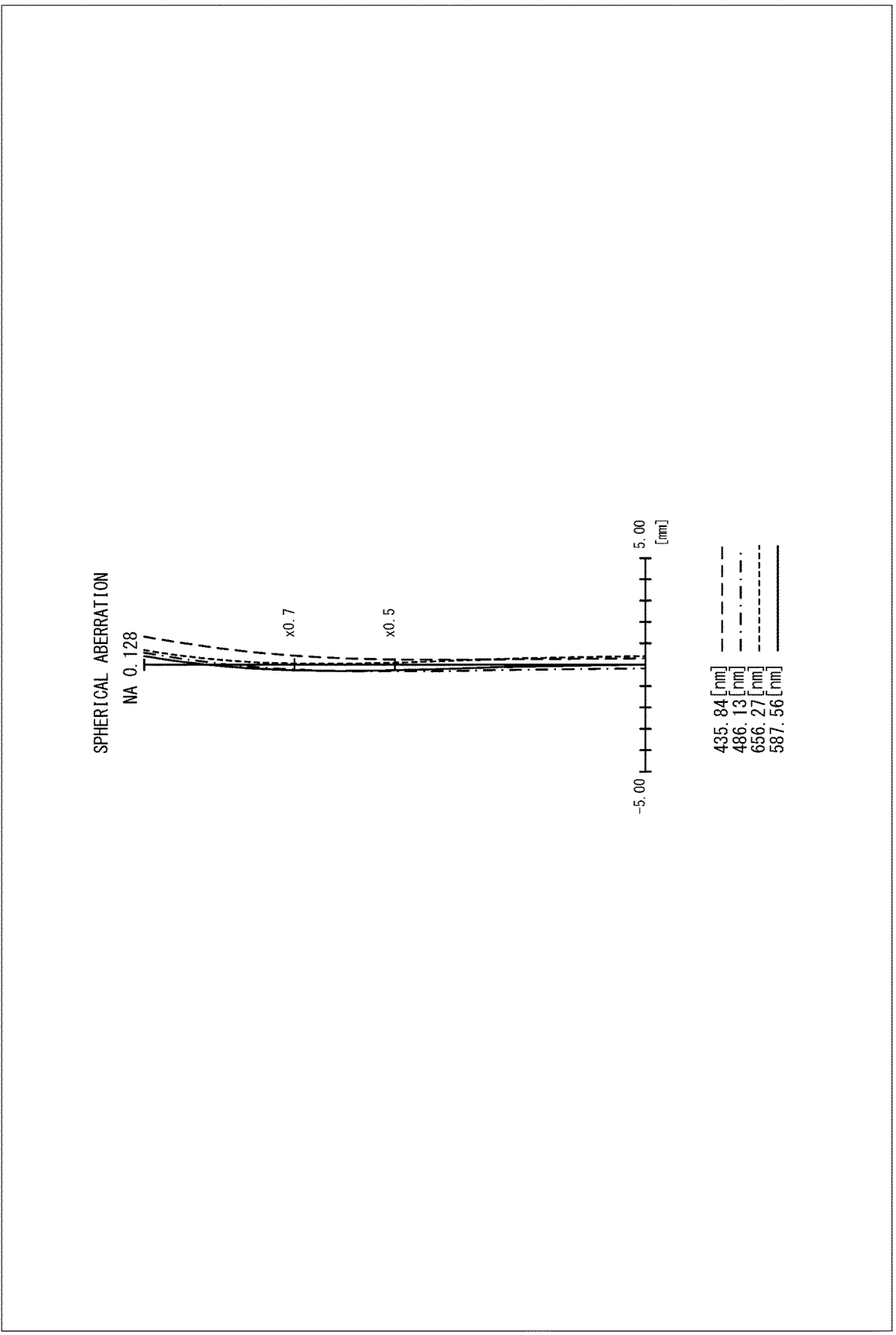
FIGS. 9A to 9D are diagrams of aberrations in an optical system including the objective and the tube lens.
Figure 9B:
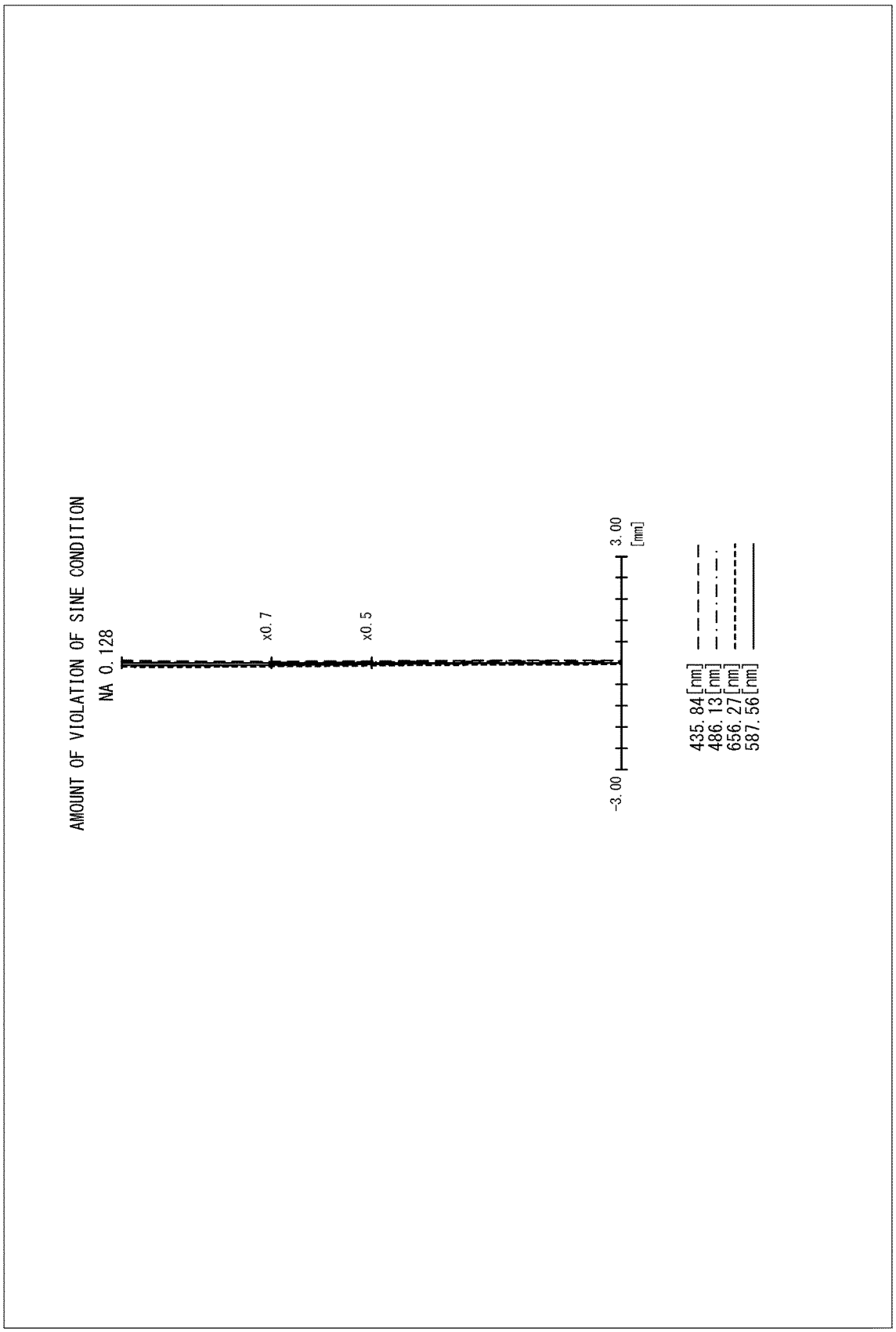
Figure 9C:
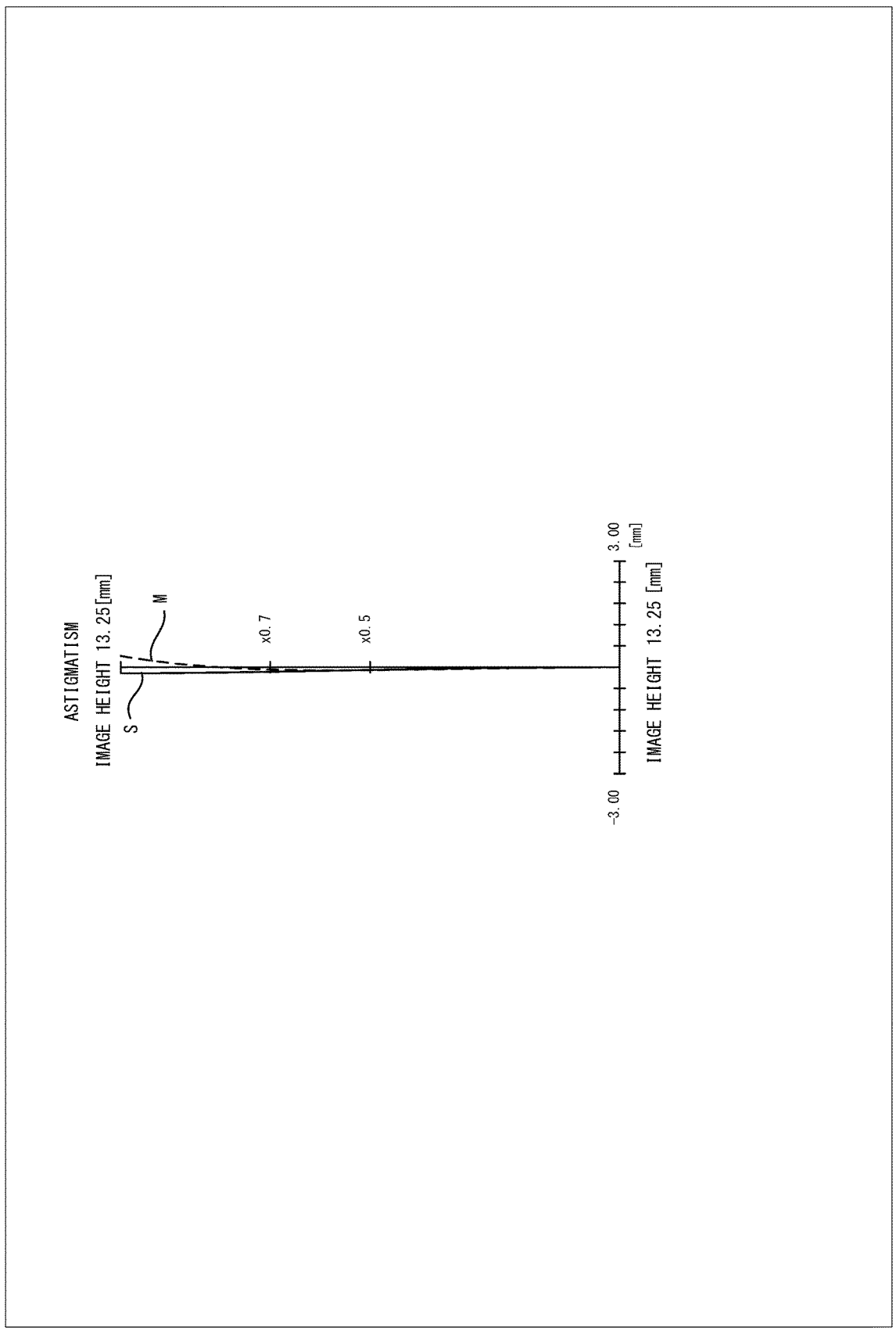
Figure 9D:
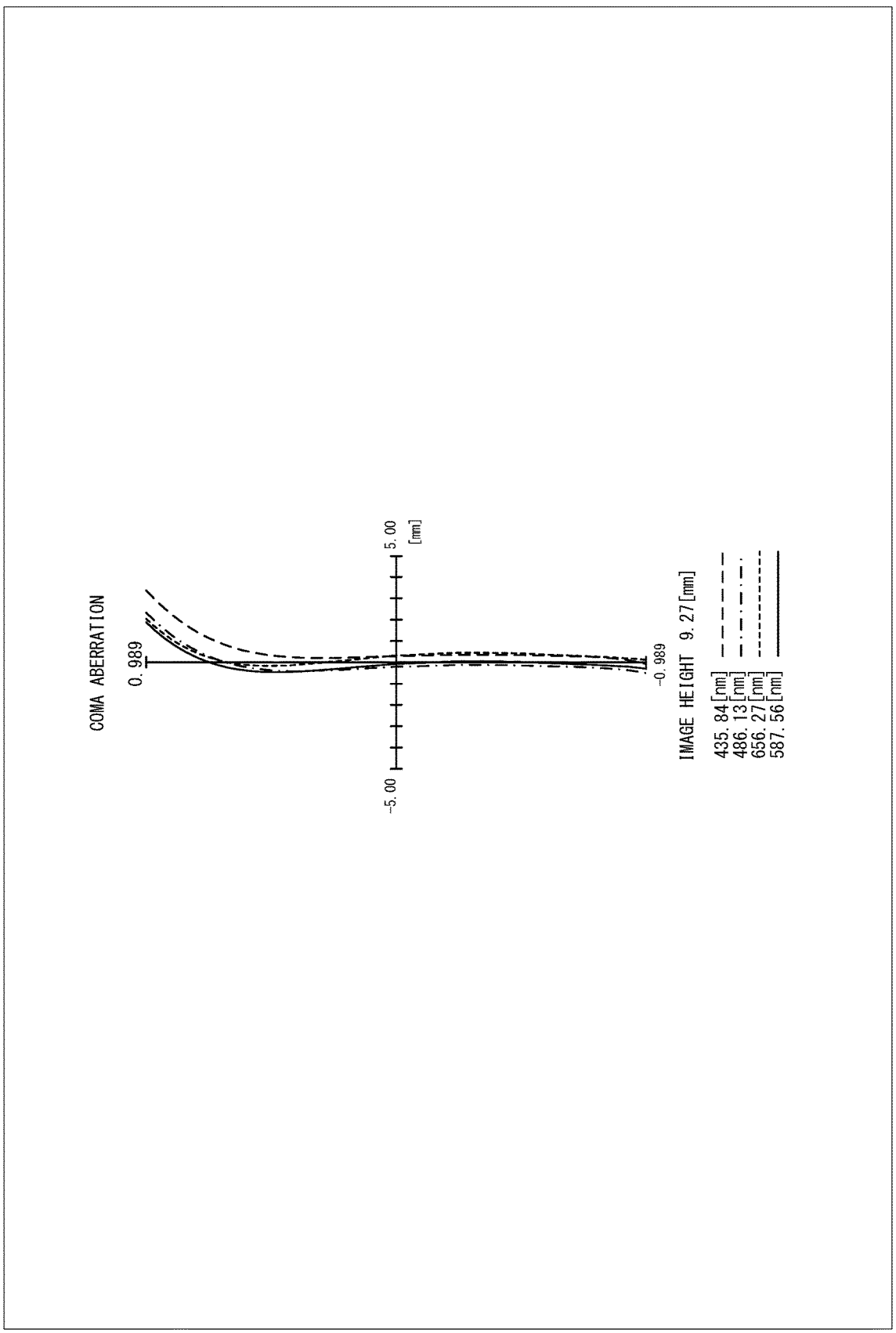

FIGS. 9A to 9D are diagrams of aberrations in an optical system including the objective 4 and the tube lens 10, and illustrate aberrations on an image plane on which the objective 4 and the tube lens 10 form an optical image. FIG. 9A is a diagram of a spherical aberration. FIG. 9B is a diagram illustrating an amount of violation of the sine condition. FIG. 9C is a diagram of astigmatism. FIG. 9D is a diagram of a coma aberration at the level of 70% of an image height ratio (image height of 9.27 mm). As illustrated in FIGS. 9A to 9D, in the present embodiment, the aberrations are favorably corrected in a wide field of view.

What is claimed is:

1. An objective comprising, in order from an object side:
    a first lens group having positive refractive power;
    a second lens group including a pair of lens components having concave surfaces facing each other; and
    a third lens group having positive refractive power;
    wherein:
    each of the pair of lens components is a cemented lens,
    the first lens group consists of one positive lens, the third lens group consists of one positive lens, and conditional expressions $$0.20 \leq d2/L \leq 0.5 \quad (1)$$

$$-20 \leq f/f_{U21} \leq -0.5 \quad (4)$$

$$-6 \leq f/f_{U22} \leq 1 \quad (5)$$

$$0.7 \leq L_{12}/f_{G1} \leq 2.1 \quad (6)$$

are satisfied, where f is a focal length of the objective, d2 is a distance on an optical axis between a surface that is situated closest to an image side in a first lens component and a surface that is situated closest to the object side in a second lens component, the first lens component being a lens component situated on the object side of the pair of lens components, the second lens component being a lens component situated on the image side of the pair of lens components, L is a distance on an optical axis between a surface that is situated closest to the object side in the objective and a surface that is situated closest to the image side in the objective, $f_{u21}$ is a focal length of the first lens component, $f_{u22}$ is a focal length of the second lens component, $L_{12}$ is a distance on an optical axis between a surface that is situated closest to the image side in the first lens group and the surface that is situated closest to the object side in the second lens component, and $f_{G1}$ is a focal length of the first lens group.

2. The objective according to claim 1, wherein a conditional expression $$0.25 \leq d1/L \leq 0.65 \quad (7)$$

is satisfied, where d1 is a distance on an optical axis between the surface that is situated closest to the image side in the first lens group and a surface that is situated closest to the object side in the second lens group.

3. The objective according to claim 2, wherein a conditional expression $$0.22 \leq R_{212}/L \leq 0.38 \quad (2)$$

is satisfied, where $R_{212}$ is a radius of curvature of the surface that is situated closest to the image side in the first lens component.

4. The objective according to claim 3, wherein a conditional expression $$-12 \leq L/R_{21c} \leq -0.4 \quad (3)$$

is satisfied, where $R_{21c}$ is a radius of curvature of a cemented surface of the first lens component.

5. The objective according to claim 2, wherein a conditional expression $$-12 \leq L/R_{21c} \leq -0.4 \quad (3)$$

is satisfied, where $R_{21c}$ is a radius of curvature of a cemented surface of the first lens component.

6. The objective according to claim 1, wherein a conditional expression $$0 \leq d1/L \leq 0.05 \quad (8)$$

is satisfied, where d1 is a distance on an optical axis between the surface that is situated closest to the image side in the first lens group and a surface that is situated closest to the object side in the second lens group.

7. The objective according to claim 6, wherein a conditional expression $$0.22 \leq R_{212}/L \leq 0.38 \quad (2)$$

is satisfied, where $R_{212}$ is a radius of curvature of the surface that is situated closest to the image side in the first lens component.

8. The objective according to claim 7, wherein a conditional expression $$-12 \leq L/R_{21c} \leq -0.4 \quad (3)$$

is satisfied, where $R_{21c}$ is a radius of curvature of a cemented surface of the first lens component.

9. The objective according to claim 1, wherein a conditional expression $$0.22 \leq R_{212}/L \leq 0.38 \quad (2)$$

is satisfied, where $R_{212}$ is a radius of curvature of the surface that is situated closest to the image side in the first lens component.

10. An objective comprising, in order from an object side:
a first lens group having positive refractive power;
a second lens group including a pair of lens components having concave surfaces facing each other; and
a third lens group having positive refractive power;
wherein:
each of the pair of lens components is a cemented lens,
the first lens group consists of one positive lens,
the third lens group consists of one positive lens, and
conditional expressions $$0.25 \leq d1/L \leq 0.65 \quad (7)$$

$$0.20 \leq d2/L \leq 0.5 \quad (1)$$

are satisfied, where d1 is a distance on an optical axis between a surface that is situated closest to the image side in the first lens group and a surface that is situated closest to the object side in the second lens group, d2 is a distance on an optical axis between a surface that is situated closest to an image side in a first lens component and a surface that is situated closest to the object side in a second lens component, the first lens component being a lens component situated on the object side of the pair of lens components, the second lens component being a lens component situated on the image side of the pair of lens components, and L is a distance on an optical axis between a surface that is situated closest to the object side in the objective and a surface that is situated closest to the image side in the objective.

11. The objective according to claim 10, wherein a conditional expression $$-20 \leq f/f_{U21} \leq -0.5 \quad (4)$$

is satisfied, where f is a focal length of the objective, and $f_{u21}$ is a focal length of the first lens component.

12. The objective according to claim 11, wherein a conditional expression $$-6 \leq f/f_{U22} \leq 1 \quad (5)$$

is satisfied, where $f_{u22}$ is a focal length of the second lens component.

13. The objective according to claim 10, wherein a conditional expression $$0.22 \leq R_{212}/L \leq 0.38 \quad (2)$$

is satisfied, where $R_{212}$ is a radius of curvature of the surface that is situated closest to the image side in the first lens component.

14. The objective according to claim 13, wherein a conditional expression $$-12 \leq L/R_{21c} \leq -0.4 \quad (3)$$

is satisfied, where $R_{21c}$ is a radius of curvature of a cemented surface of the first lens component.

15. The objective according to claim 10, wherein a conditional expression $$-12 \leq L/R_{21c} \leq -0.4 \quad (3)$$

is satisfied, where $R_{21c}$ is a radius of curvature of a cemented surface of the first lens component.

16. The objective according to claim 10, wherein $$-6 \leq f/f_{U22} \leq 1 \quad (5)$$

is satisfied, where f is a focal length of the objective, and $f_{u22}$ is a focal length of the second lens component.

17. The objective according to claim 10, wherein a conditional expression $$0.7 \leq L_{12}/f_{G1} \leq 2.1 \quad (6)$$

is satisfied, where $L_{12}$ is a distance on an optical axis between the surface that is situated closest to the image side in the first lens group and the surface that is situated closest to the object side in the second lens component, and $f_{G1}$ is a focal length of the first lens group.

18. The objective according to claim 17, wherein a conditional expression $$0.22 \leq R_{212}/L \leq 0.38 \quad (2)$$

is satisfied, where $R_{212}$ is a radius of curvature of the surface that is situated closest to the image side in the first lens component.

19. The objective according to claim 18, wherein a conditional expression $$-12 \leq L/R_{21c} \leq -0.4 \quad (3)$$

is satisfied, where $R_{21c}$ is a radius of curvature of a cemented surface of the first lens component.

\* \* \* \* \*